United States Patent
Donovan et al.

(10) Patent No.: US 7,460,149 B1
(45) Date of Patent: Dec. 2, 2008

(54) VIDEO DATA STORAGE, SEARCH, AND RETRIEVAL USING META-DATA AND ATTRIBUTE DATA IN A VIDEO SURVEILLANCE SYSTEM

(75) Inventors: John J. Donovan, Hamilton, MA (US); Danir Hussain, New York, NY (US)

(73) Assignee: KD Secure, LLC, Cambridge, MA (US)

( * ) Notice: Subject to any disclaimer, the term of this patent is extended or adjusted under 35 U.S.C. 154(b) by 0 days.

(21) Appl. No.: 11/754,335

(22) Filed: May 28, 2007

(51) Int. Cl.
*H04N 7/18* (2006.01)
*H04N 5/781* (2006.01)

(52) U.S. Cl. ...................................... 348/143; 386/46

(58) Field of Classification Search ................ 348/143, 348/135, 142, 154, 171, 172, 169, 155, 152, 348/231.99, 700, 231.2, 231.3, 231.5; 382/103, 382/107, 194, 235, 236, 224, 305, 190, 195, 382/232, 217, 173, 225, 226, 227, 228, 229, 382/230, 231, 159, 118, 170, 218; 386/46, 386/125; 375/240
See application file for complete search history.

(56) References Cited

U.S. PATENT DOCUMENTS

| | | | |
|---|---|---|---|
| 6,424,370 B1* | 7/2002 | Courtney | 348/143 |
| 6,665,442 B2* | 12/2003 | Sekiguchi et al. | 382/224 |
| 7,212,650 B2* | 5/2007 | Sumi | 382/103 |
| 2001/0004739 A1* | 6/2001 | Sekiguchi et al. | 707/100 |
| 2002/0073079 A1* | 6/2002 | Terheggen | 707/3 |
| 2005/0123267 A1* | 6/2005 | Tsumagari et al. | 386/46 |
| 2006/0053153 A1* | 3/2006 | Takeshima et al. | 707/102 |
| 2006/0198554 A1* | 9/2006 | Porter et al. | 382/159 |
| 2006/0217990 A1* | 9/2006 | Theimer et al. | 705/1 |
| 2007/0156677 A1* | 7/2007 | Szabo | 707/5 |
| 2008/0092168 A1* | 4/2008 | Logan et al. | 725/44 |

* cited by examiner

*Primary Examiner*—Behrooz Senfi
(74) *Attorney, Agent, or Firm*—Daniar Hussain; American Pioneer Ventures

(57) ABSTRACT

One embodiment is a method of storing video data from a video surveillance system having one or more cameras. Video data is captured from one or more surveillance cameras. Meta-data is automatically generated by performing video analysis on the captured video data from the surveillance cameras. A human operator may manually enter additional meta-data. Attribute data and associated weights, representing information about the relevance of the meta-data, is received. The video data is stored in a hierarchical video storage area; the meta-data, indexed by date and time stamp to the video data, is stored in a meta-data storage area; and the attribute data is stored in an attribute storage area. One or more alerts may be issued based on the past and present meta-data. The video data is secured by encrypting and storing the video data remotely, and audit trails are generated about who and when viewed the video data.

22 Claims, 11 Drawing Sheets

200

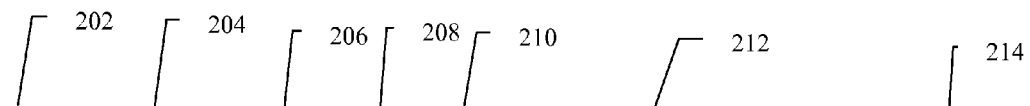

| Event | Location | Date | Start Time | End Time | Pointer to Video Data | Access Privileges |
|---|---|---|---|---|---|---|
| Motion | Camera 1 | May 15, 2007 | 10:00 | 10:23 | C:\VIDEO\CAMERA1\05152007.mpg | ... |
| Gunshot | Parking Lot | May 16, 2007 | 19:56 | 19:57 | ftp://video.storage.com/camera3/05162007.mpeg | ... |
| Number of People Exceeds Threshold | Camera 1 | May 15, 2007 | 15:22 | 15:45 | C:\VIDEO\CAMERA1\05152007.mpg | ... |
| Speed of Object Exceeds Threshold | Lobby | May 16, 2007 | 17:45 | 17:48 | ftp://video.storage.com/camera2/05162007.mpg | ... |
| Motion | Parking Lot | May 16, 2007 | 21:08 | 23:55 | ftp://video.storage.com/camera3/05162007.mpg | ... |
| Motion | Parking Lot | May 16, 2007 | 00:05 | 00:43 | ftp://video.storage.com/camera3/05162007.mpg | ... |

| Device | Attribute | Weight | Dynamic | Access Privileges |
|---|---|---|---|---|
| Camera 1 | Motion Event | 0.85 | TRUE | ... |
| Camera 1 | Gunshot Event | 0.05 | FALSE | ... |
| Camera 1 | Age | f(age) | TRUE | ... |
| Camera 1 | Time Since Last Maintenance | g(maintenance) | TRUE | ... |
| Camera 1 | Frequency of Failure | h(history) | TRUE | ... |
| Camera 2 | Resolution | m(resolution) | FALSE | ... |
| Gunshot Detector 1 | Motion Event | 0.15 | FALSE | ... |
| Gunshot Detector 1 | Gunshot Event | 0.70 | TRUE | ... |
| Camera 2 | Number of People Event | 0.80 | TRUE | ... |
| Camera 3 | Number of People Event | 0.40 | TRUE | ... |

Figure 3

VIDEO DATA STORAGE, SEARCH, AND RETRIEVAL USING META-DATA AND ATTRIBUTE DATA IN A VIDEO SURVEILLANCE SYSTEM

REFERENCE TO RELATED APPLICATIONS

This application claims priority from co-pending U.S. application Ser. No. 11/746,043 entitled "Apparatus, methods, and systems for intelligent security and safety" to John Donovan et al., filed on May 8, 2007, the entirety of which is hereby incorporated by reference herein.

FIELD OF THE INVENTION

The present invention is generally related to video data storage in security and surveillance systems and applications. More specifically, this invention relates to storage of video data and associated meta-data and attribute data, and subsequent search and retrieval of the video data using the meta-data. The present invention may be used to store, search, and retrieve video data and meta-data that has been obtained from surveillance cameras in various security and safety applications. The present invention may be used to help fight crime, detect and possibly prevent terrorist activity, and help ensure safety procedures are followed.

BACKGROUND OF THE INVENTION

As citizens of a dangerous world, we all face security and safety risks. Every day, 30 people die by gunshot in the U.S.—one every 48 minutes. A police officer dies from a gunshot wound every ten days. Analysis of past video data may save lives.

A recently foiled terrorist attack on Ft. Dix Army Base in New Jersey involved five terrorists planning to kill U.S. soldiers at the army base. They were observed in video cameras surveying the army base on numerous occasions prior to the planned attack. A well-meaning citizen notified the police and FBI by submitting a "video tip" which started an investigation. The video tip was a video of the men training for the terrorist attack and plotting to kill as many American soldiers in as short a time as possible. Accordingly, the military is concerned about historical analysis of past video data, as well as data from video tips.

Muggings and home intrusions are another threat to citizens. In Seattle, Wash. one in every 60 homes was burglarized in 2006. In Boston, Mass. in 2007 an 87-year old woman opened her home only to find a burglar in her home. Proactive alerts based on past video data may deter such crimes.

Vandalism and damage to property decreases property values. One study conducted by the London School of Economics found that "a one-tenth standard deviation increase in the recorded density of incidents of criminal damage has a capitalized cost of just under 1% of property values, or £2,200 on the average Inner London property" (Steve Gibbons, The Costs of Urban Property Crime, 2003). Analysis of current and past video data may prevent such vandalism.

Violence in schools and on college campuses continues to rise, and has increased concern among students, parents, and teachers. A shooting at Virginia Tech University in 2007 resulted in the killing of 32 people and injured 24 others. In 2005, a professor at MIT was shot four times in a parking lot on campus. If the video data was stored and analyzed using meta-data, the assailants could have been apprehended. The shooting may have even been thwarted.

Serious accidents at corporate facilities have resulted in enormous damage to personal lives and to corporate property. For example, an explosion in a Texas oil refinery killed 15 people and injured 180 others. The U.S. Chemical Safety Board determined that various factors, one of which was the absence of adequate experience in the refinery, contributed to the accident: "As the unit was being heated, the Day Supervisor, an experienced ISOM operator, left the plant at 10:47 a.m. due to a family emergency. The second Day Supervisor was devoting most of his attention to the final stages of the ARU startup; he had very little ISOM experience and, therefore, did not get involved in the ISOM startup. No experienced supervisor or ISOM technical expert was assigned to the raffinate section startup after the Day Supervisor left, although BP's safety procedures required such oversight." (Chemical Safety Board, Investigation Report: Refinery Explosion and Fire, March 2007, pg. 52.) Video surveillance, storage, and analysis could have prevented these deaths and injuries.

As a result of terrorist activity (such as the attempted terrorist attack on Ft. Dix), violence on college campuses (such as the shooting at Virginia Tech University), and major accidents (such as the oil refinery explosion in Texas), governments, corporations, universities, other institutions, and individuals are increasingly concerned about security and safety. To address this problem, many of these institutions are installing security and surveillance cameras around their facilities, campuses, and military installations.

Once the video data is captured by these cameras, which could be analog or digital cameras, the video data has to be stored, and subsequently retrieved, and information about the quality of the images also has to be stored. There are numerous problems with conventional video data storage and retrieval systems. For example, conventional video data from analogue cameras that is stored on VHS tape is difficult to store and retrieve. The VHS tape has to be rewound multiple times to search for a particular occurrence. This can damage the VHS tape, by stretching the VHS tape and scraping the polymer coating.

Digital video data from digital cameras may be stored in digital, random-access media, such as disk. Unfortunately, the vast amount of data generated by digital video cameras is also difficult to store, search, and retrieve from disk. For example, a typical 3 Megapixel digital surveillance camera generates images of approximately 280 Kbytes per frame. If this camera were running at 5 frames per second, it would generate approximately 60 GB per day. If an organization wanted to archive the data for one month, it would take approximately 1.8 TB, and if the organization wanted to archive the data for one year, it would take approximately 22 TB. In a typical application having 100 surveillance cameras around a particular facility, this translates into approximately 6 TB per day, or approximately 180 TB per month, or over approximately 2,000 TB per year! This is a large amount of data to store, search, and retrieve by traditional mechanisms. Present systems cannot store, archive, search, and retrieve such large amounts of data effectively and intelligently. When a pro-active alert that depends on past video data needs to be issued to deter a crime or other dangerous event, or past video data needs to be forensically analyzed for a past crime or other dangerous event, the inadequacies of present systems is even more apparent.

One drawback with conventional video storage is that the video data is only indexed by date and time. Therefore, an operator must know the date and time of events of interest before being able to search for those events.

Once the video data has been stored, another drawback with conventional video storage is the inability to perform intelligent search. For example, present systems cannot perform search by various meta-data criteria, such as "show all times when 2 or more people were detected in a given area." Another drawback with conventional video storage is the inability to perform a search that retrieves video data across multiple locations and cameras. For example, present systems cannot perform a search such as "show all times when there was a gunshot detected at this location, and 2 or more people were detected in an adjacent area."

Another drawback with conventional video storage is that all video data is weighted equally. For example, motion detected in an ammunition storage area of an army base would be weighted equally to motion detected in the basement of a dinning hall of the army base. In addition, video data from an old, low quality camera would receive the same weight as video data from a new, high quality camera.

Once the video data is stored, another drawback with conventional video storage is data security and integrity. Anyone who has physical access to the disk or tape can damage it, destroying potentially valuable evidence. For example, after a shooting on MIT's campus, the District Attorney's office gained access to the surveillance tape, deleted the video of the shooting, deleted date and time stamps from the tape, and rearranged the remaining images to portray a different set of actions, as well as permanently damaging the original tape. Another drawback with conventional video storage is the difficulties associated with archiving the video data.

Another drawback with conventional video storage is the inability to audit the video data, for example, determine who viewed the video data, and thus provide for audit of the video data.

Another drawback with convention video storage and analysis is the inability to utilize tips. Tips, that is, information from informants, are an important source of data. With the proliferation of video phones (cell phones with integrated cameras), tips are increasingly received as video clips captured at the scene of a crime by well-meaning citizens.

These drawbacks can be overcome with the attendant features and advantages of the present invention. Therefore, as recognized by the present inventors, what are needed are a method, apparatus, and system for storing, searching, archiving, protecting, auditing, and retrieving video data and associated meta-data and attribute data.

What is also needed is a method for monitoring and auditing the stored video data as well as live video data. What is also needed is a method for intelligent alerting of appropriate individuals based on stored video data as well as the live video data.

Accordingly, it would be an advancement in the state of the art to provide an apparatus, system, and method for storing, searching, auditing, and retrieving video data received from multiple cameras, and for generating intelligent alerts based on the stored video data.

It is against this background that various embodiments of the present invention were developed.

BRIEF SUMMARY OF THE INVENTION

The present invention is a method, a system, and an apparatus for video data storage, search, auditing, and retrieval. As used herein, the term "meta-data" shall mean data about events that have been captured and detected in the video. For example, meta-data could include the number of people detected in a video, motion detected, loud noises detected, etc. As used herein, the term "attribute data" shall mean data about the data, such as integrity of the data, source of the data, reliability of the data, and so on. For example, maintenance attribute data would have a different weight for a camera that was not maintained in the last 5 years compared to a camera that is regularly maintained every 6 months. Attribute data includes "attributes," which are attributes of the data, and their associated "weights, or weight functions" which are probabilistic weights attached to the video data. For example, an attribute would be "age of the video data," and an associated weight function would be a function decreasing with age. Some weights may also change with external events, such as maintenance, time, and so on. For example, a weight associated with a camera may go down if the camera was not maintained for a period of time.

One embodiment of the present invention stores meta-data, indexed to the video data, in order to facilitate search and retrieval. The meta-data may be generated by one or more video detection components, such as a motion detection module or a gunshot detection module, or may be generated by a human operator, such a security guard. In one embodiment, the meta-data is added approximately contemporaneously to the capture and storage of the video data. In an alternate embodiment, the meta-data is added subsequent to the capture and storage of the video data.

In one embodiment, the video data may be stored in a video data storage module (a logical unit). The video data storage module may be organized as a hierarchical storage module, in which data that is less frequently used is migrated to slower and/or less expensive storage media. The meta-data may be stored in a meta-data storage module (a logical unit), which may be logically part of the video data storage module, or may be logically separate from the video data storage module. Attribute data, including the weights associated with the meta-data, may be stored in an attribute storage module (another logical unit). The video data storage module, the meta-data storage module, and the attribute data storage module may be located on the same physical media, or they may be located on different physical media. The video data storage module, the meta-data storage module, and the attribute storage module may be stored on hard disk, optical disk, magnetic disk, flash memory, tape memory, RAID array, NAS (Network Attached Storage), SAN (Storage Area Network), or any other physical or virtual storage media.

One embodiment of the present invention is a method for storing video data ("the method"). This method includes the following steps. Video data is received from one or more video sources, such as network-attached IP cameras. Evaluating one or more functions of the video data, such as a motion detection function or a gunshot detection function, generates meta-data. The video data is stored in a video storage module, which could be located on a RAID disk or tape. The meta-data, indexed to the video data, is stored in a meta-data storage module, which could be located on the same disk as the video data, or on a different disk.

Another embodiment of the present invention is the method described above that also includes storing attribute data, which is either entered manually or determined heuristically.

Another embodiment of the present invention is the method described above that also includes the step of performing video analysis on the video data from the one or more video sources to generate the meta-data. The video analysis could include motion detection, gunshot detection, or any other video/image analysis function, or component, which can generate meta-data. Various video detection components are described below.

Yet another embodiment of the present invention is the method described above that also includes the steps of assigning a time-stamp to the meta-data, the time-stamp providing an index into the video data; and storing the meta-data with the time-stamp in the meta-data storage module.

Yet another embodiment of the present invention is the method described above that also includes the steps of receiving input data from one or more data sources, which could be legacy systems; generating additional meta-data based on one or more functions of the input data; and storing the additional meta-data, indexed to the video data, in the meta-data storage module.

Yet another embodiment of the present invention is the method described above that also includes the steps of generating additional meta-data based on an intersection of one or more functions of the video data from two or more video sources; and storing the additional meta-data, indexed to the video data, in the meta-data storage module.

Yet another embodiment of the present invention is the method described above that also includes the step of providing additional meta-data generated by a human operator; and storing the additional human generated meta-data, indexed to the video data, in the meta-data storage module.

Yet another embodiment of the present invention is the method described above that also includes the steps of receiving historical video data from the video storage module; evaluating a set of rules based on the historical video data and the generated meta-data; and performing one or more actions based on the evaluation of the set of rules.

Yet another embodiment of the present invention is the method described above that also includes the steps of retrieving historical meta-data from the meta-data storage module, evaluating a set of rules based on the historical meta-data and the generated meta-data, and performing one or more actions based on the evaluation of the set of rules.

Yet another embodiment of the present invention is the method described above where the one or more actions include an alert.

Yet another embodiment of the present invention is the method described above where the video storage module is a hierarchical storage module.

Meta-data may be added automatically by various sensory devices or video detection components. For example, a motion detection component generates meta-data that is indexed to the video data where the motion was detected. In another example, a gunshot detection component generates meta-data that is indexed to the video data where the gunshot was detected. The meta-data may also be generated by a human operator.

The meta-data detection components are configurable by a system administrator. The system administrator may customize the types of video detection components that are activated and the meta-data that is generated and recorded. In one embodiment, a human operator adds meta-data. For example, a human operator may add meta-data indicating, "suspicious activity was observed at this location." In another example, a human operator may transcribe the voice associated with the video data, and the transcriptions serve as meta-data associated with the video data.

In addition, attribute data is also stored, and associated with the video data. Attribute data is information about the video data, such as its source, reliability, etc. For example, one type of attribute data is the camera that the video data was acquired from. Another example of attribute data is the quality of the camera that was used to acquire the video data (e.g., a 3 Megapixel camera would be weighted higher than a VGA camera for purposes of face recognition). Another example of attribute data is the historical pattern of a camera being susceptible to being tampered with.

One embodiment of the present invention provides a user interface for a system administrator to enter and customize the attribute data. A particular user of the present invention would customize the present system by entering weights that are associated with attribute data. For example, the system administrator would select the attribute data that corresponds with each camera. A system administrator may identify a low-hanging camera that may be easily tampered with a lower attribute weight, while a high-hanging camera that is difficult to tamper with a higher attribute weight.

One embodiment of the present invention automatically upgrades or downgrades the weights associated with attributes. For example, decreasing a weight with age of a camera. Another embodiment of the present invention is a user interface that allows for updating the attributes and associated weights. Another embodiment of the present invention heuristically learns and updates the weights. For example, it may learn that certain cameras are degrading in their reliability.

In one embodiment of the present invention, video data is captured and stored in a remote location. The video data may be sent via a network, such as the Internet, or a dedicated fiber optic line, to a remote, secure location. If the local copy of the data is damaged, destroyed, or tampered with, the copy in the remote location may be accessed and analyzed. All video data may be automatically archived to the remote location.

In one embodiment of the present invention, video data is archived in a hierarchical storage module. A hierarchy of storage modules, with varying speeds, locations, and reliabilities are provided. For example, a high reliability, fast, local RAID disk is provided. In addition, a lower reliability, slower tape drive may also be provided. Additionally, an off-site storage module, which may be connected by a dedicated fiber optic or via the Internet, may also be provided. Video data may be cascaded through the storage hierarchy based on such factors as time, access frequency, as well as its associated meta-data. For example, video data that is older than 30 days may be moved from the RAID disk to the tape drive. On the contrary, video data that has been accessed frequently, even though the data may be older than 30 days, may be stored on the RAID disk. Most importantly, video data may be cascaded through the storage hierarchy based on its associated meta-data. That is, video data that has meta-data indicating a gunshot was detected will be stored in more reliable, faster storage no matter how old or how little the data was accessed. Video data that has meta-data indicating that virtually nothing happened may be immediately moved to tape or off-site storage.

One embodiment of the present invention provides an audit trail for the data. An audit trail is generated, indicating who and when has viewed or accessed the data. An audit trail is also generated indicating from which cameras the video data was captured with, and if there are any unusual circumstances associated with that camera, for example, weather conditions, power outages, or tampering.

One embodiment of the present invention provides data integrity and security by encrypting the video data, and only allowing authorized individuals access to the encryption key.

One embodiment of the present invention allows the receipt and storage of tips, including video tips. Video tips may be video clips recorded by video phones (cell phones with integrated cameras), digital cameras, handheld video cameras, etc. that are sent in by well-meaning citizens.

Other embodiments of the present invention include the methods described here but implemented in computer-readable media and/or embedded in hardware. Other features and advantages of the various embodiments of the present invention will be apparent from the following more particular description of embodiments of the invention as illustrated in the accompanying drawings.

BRIEF DESCRIPTION OF THE DRAWINGS

FIG. 2 shows an illustrative meta-data table according to one embodiment of the present invention;

FIG. 3 shows an illustrative attribute data table in accordance with one embodiment of the present invention;

DETAILED DESCRIPTION OF THE INVENTION

The present invention is a system, a method, and an apparatus for storing, searching, and retrieving video data. The video data is received from one or more cameras, which could be digital IP cameras. Meta-data is generated by one or more detection components, or manually entered by a human operator. The video data and corresponding meta-data, indexed to the video data, are stored. Attribute data, which relates to such things as the reliability of the meta-data and the video data, and associated weights, or weight functions, is also stored. Attribute data may be determined by a system administrator, and/or determined heuristically.

Figure 1:
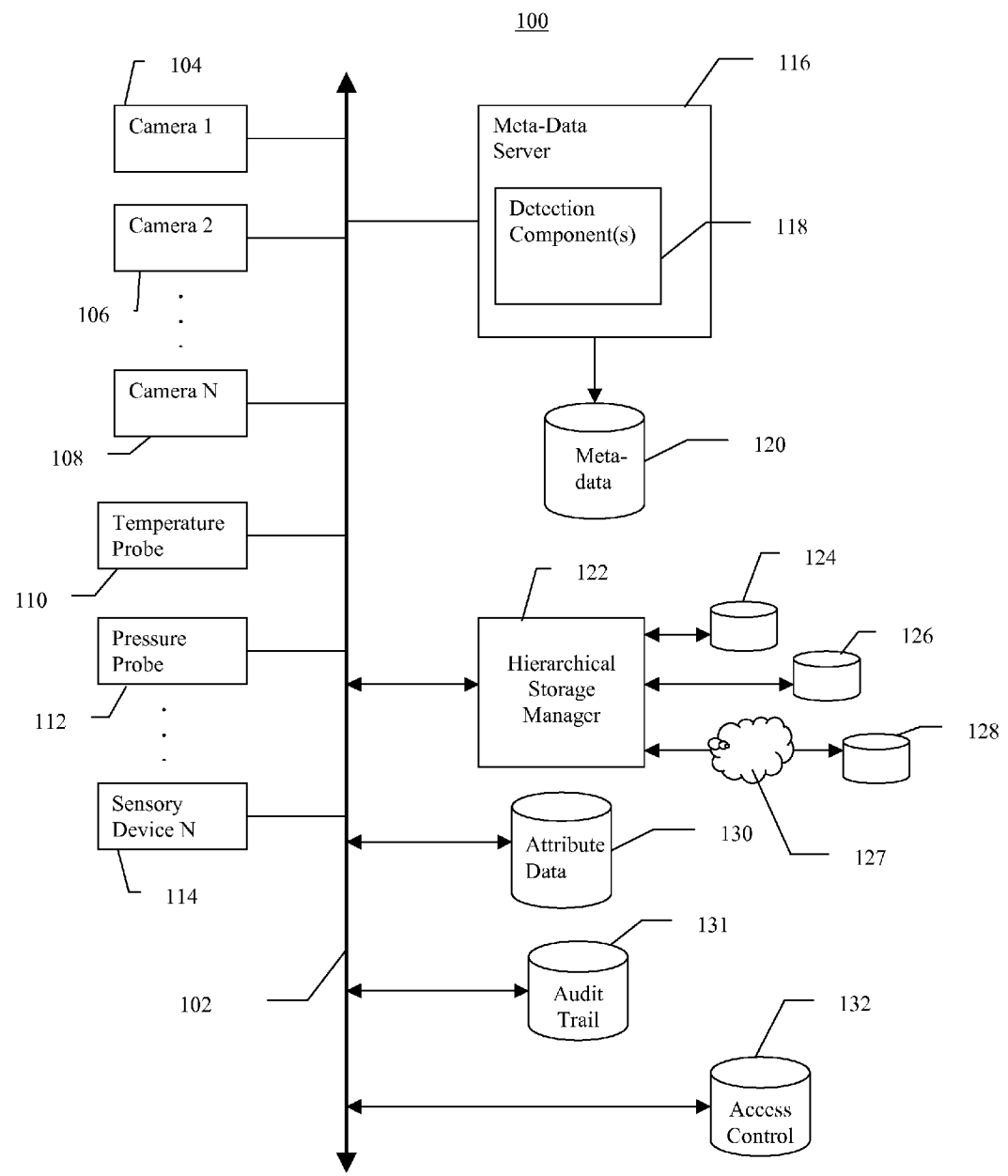
FIG. 1 illustrates a system architecture for storage and retrieval of video data according to one embodiment of the present invention.

FIG. 1 shows an example of a system architecture 100 of one embodiment of the present invention. One or more cameras 104, 106, 108, or other video capture devices capture one or more streams of vide data. One or more additional sensory devices, such as temperature probe 110, pressure probe 112, and other sensory device 114 provide sensory data that complements the video data. A hierarchical storage manager 122, which could be software running on a dedicated server, stores, or records, the video data to one or more storage media 124, 126, 128. Storage media 128 may be a remote storage media connected by transmission media 127. Transmission media 127 may be a dedicated fiber optic line or a public network such as the Internet. Storage media 124, 126, and 128 may be hard disk, magnetic tape, and the like. The cameras 104-108 and other sensory devices 110-114 may themselves generate meta-data in the hardware. For example, digital surveillance cameras generate motion meta-data that indicate when motion was detected in a particular field of view of the camera. In addition, meta-data server 116 may process video data in software, for example by using detection component(s) 118, and generate meta-data corresponding to the video data. For example, a people counting detection component may count the number of people that were detected in a video stream, and generate meta-data indicating the number of people detected. The meta-data server 116 stores the meta-data in meta-data storage module, or area, 120.

In addition, attribute data, which is information about the meta-data, is stored in attribute data storage 130. Attribute data may include such things as the reliability of the meta-data, the reliability of the source of the meta-data, the age of the meta-data, and so on.

In addition, an audit trail, containing information about who has accessed the video data, how frequently, and so on is stored in audit trail storage area 131. Each time someone accesses or views a video file from the video storage module, audit information is stored in audit storage module 131.

Access control storage area 132 stores access rights and privileges. Access to view the video data is only given to those authorized individuals who are listed in the access control storage area. Access may be restricted based on the video data, or its associated meta-data. For example, any security officer may be able to view the video data taken at night, but only security officers assigned to investigate a particular case may be given access to the video data where a gunshot was detected.

Access to attribute data may also be restricted. For example, only certain high-level security officers may have access to high quality video data from behind a bank teller that may show checks and amounts, whereas any security officer may see the video data from the bank's lobby. Access may also be modulated based on the quality of the video data. For example, anybody may be able to login and view a VGA resolution view of the lobby of their building, but only the security officer can see the mega-pixel resolution video. The access control may be implemented using an authentication scheme provided by the operating system, such as Microsoft ActiveDirectory™.

Cameras used in the present invention may be digital IP cameras, digital PC cameras, web-cams, analog cameras, cameras attached to camera servers, analog cameras attached to DVRs, etc. Any camera device is within the scope of the present invention, as long as the camera device can capture video. Some cameras may have an integrated microphone; alternatively, a separate microphone may be used to capture audio data along with video data. As used herein, the terms "video," "video data," "video source," etc. is meant to include video without audio, as well as video with interlaced audio (audiovisual information). Of course, it is to be understood that the present invention may also be implemented using audio data without accompanying video data by replacing cameras with microphones.

The system diagram shown in FIG. 1 is illustrative of only one implementation of the present invention. For example, the meta-data server and the hierarchical storage module may be on dedicated servers, as shown in FIG. 1 for clarity. Alternatively, a common server may provide the functionality of the meta-data server and the hierarchical storage module. Likewise, as shown in FIG. 1 for clarity, the meta-data and the video data may be stored on different media. Alternatively, the meta-data and the video data may be stored on the same physical storage media. Similarly, the attribute data is shown stored in a separate attribute data storage area. The attribute data may be stored on a dedicated storage area, as illustrated, or may be stored on the same storage as the meta-data and/or the video data.

FIG. 2 shows a table 200 of possible meta-data that may be stored. Column 202 corresponds to events that were either generated by sensory devices, or by the meta-data server of FIG. 1. Illustrative events could be motion detected, gunshot detected, number of people in an area exceeds a threshold, speed of an object in a given area exceeds a threshold, and similar events. The sensory devices themselves, the meta-data server, or both, could generate these events, as described previously. Column 204 represents locations corresponding to those events. For example, locations could be the camera names or locations, such as "Camera 1," "Parking Lot," "Lobby," etc. Column 206 represents the dates the events occurred. For example, a motion event was detected on May 15, 2007. Columns 208 and 210 represent the start and end times of the events, and are one form of indices into the video data. For example, a motion event occurred in Camera 1 on May 15, 2007 from 10:00 AM through 10:23 AM. Column 212 provides a pointer, or an index, to the video data that corresponds to the occurrence of that event. For example, the first event is stored by the hierarchical storage module on a local disk, while the second event is stored on a remote disk, for example, a NAS or a disk attached to a server. Finally, Column 214 stores access privileges associates with the event. For example, events where gunshots were detected may have a higher security level than ordinary motion events.

As video data is captured by the cameras, and stored in the hierarchical storage module, meta-data is indexed to the video data, and stored in the meta-data storage module. As noted previously, the meta-data may be generated by one or more sensory devices, including the cameras themselves, or may be entered manually by a human operator, such as a security guard.

The present invention provides a user interface by which a human operator may enter meta-data. For example, a user interface is provided for a security officer to monitor one or more cameras. The cameras automatically generate meta-data, as noted above. In addition, the human operator may add meta-data manually. For example, if the human operator observes suspicious activity going on in a particular camera, the human operator may add meta-data corresponding to suspicious activity, and the meta-data server in the meta-data storage module would store the meta-data.

The human operator may select from a set of possible meta-data tags, as well as add "free-form" meta-data by typing into a text-entry box. For example, a human operator may transcribe speech in the video data. The transcribed speech serves as meta-data to the video data. After the video data has been tagged by meta-data, it is possible to use the present system to search for keywords, such as all the times when a judge said "Order, Order" in a courtroom surveillance camera.

The present invention also provides a user interface by which a human operator may enter attribute data. Attribute data is information about the video data and its associated meta-data, such as its source, reliability, etc. For example, one type of attribute data is the camera that the video data was acquired from. Another example of attribute data is the quality of the camera that was used to acquire the video data (e.g., a 3 Megapixel camera would be weighted higher than a VGA camera for purposes of face recognition). Another example of attribute data is the historical pattern of a camera being susceptible to being tampered with.

Other examples of attribute data include, but are not limited to, time the camera was repaired or installed, reliability of power to the camera, reliability of transmission, bandwidth, susceptibility to noise, interference, overexposure, weather conditions, age of the camera, type of camera (night, IR, etc.).

FIG. 3 illustrates an example of attribute data 300, which includes attributes about the meta-data and their associated weights, or weighing functions. Column 302 shows various sensory devices and column 304 shows associated attributes. The weights, or weighing functions, associated with the attributes are shown in column 306. Column 308 indicates whether the weight is dynamic, that is, whether the weight changes with time, external events, and so on. Finally, column 310 indicates access privileges of individuals authorized to change the attribute data.

Different sensory devices, including different cameras, may have different attributes associated with them. Each attribute determines a weight, which could be a constant, or the weight could be a weighing function of the attribute. For example, consider a camera 1 that is not designed to detect gunshots, but which has a low-quality, integrated microphone, and so a gunshot detection component may use the audio to detect loud shots as gunshots. When a motion event is detected on such a camera, it would be assigned a high weight (for example, 0.85 or 85%). On the other hand, if a gunshot was detected on this camera by a gunshot detection component, the gunshot event would be assigned a low weight (0.05, or 5%) because the camera is known to have a low-quality microphone, and what may have been detected as a gunshot may have just been a drop of a metal object. In contrast, gunshot detector 1 may have the opposite attribute-weight profile, in that motion events from the gunshot detector may be weighted low (say, 0.15 or 15%) while gunshot events may be weighted high (say, 0.70 or 70%).

Other examples of attribute data and associates weights are shown in FIG. 3. Camera 1 may have an age attribute, indicating the age of the camera, and an associated weighting function that weights any data from the camera with a function that decreases with the age of the camera. The time since the last maintenance of the camera may also serve to generate a weight. This could be a step-function that, for example, a function dropping to zero after 1 year of no maintenance on the camera. The frequency of failure may also serve to weigh any data from the camera, again using a function that weights data lower from a camera that has a high frequency of failure. The resolution of the camera may also serves as attribute data to assign a weight to the data; data from a high-resolution camera would be assigned a higher weight than data from a lower resolution camera.

Another example of attribute data and associated weights that are tied to particular meta-data includes weights assigned to meta-data indicating the number of people in a particular area. This meta-data may be assigned a high weight (0.80) if it comes from camera 2, which may have high resolution, high frame-rate, and other qualities that make it amenable to high reliability for people counting purposes. Contrary, if the same meta-data comes from camera 3, which has low resolution, low frame-rate, or other qualities that make it unreliable when it comes to counting people, the meta-data may be assigned a low weight (0.40).

A system administrator may enter and customize the attribute data. A system administrator would customize the present system by entering weights that are associated with attribute data. For example, the system administrator would select the attribute data that corresponds with each camera. A system administrator may identify a low-hanging camera that may be easily tampered with a lower attribute weight, while a high-hanging camera that is difficult to tamper with a higher attribute weight.

In another example, the system administrator would customize the attribute data for different image qualities. For example, the system administrator would select the weights associated with video data, and the corresponding meta-data, associated with different resolutions of cameras. That is, a higher resolution camera and its associated meta-data would be weighted higher than a lower resolution camera, and the system administrator would select the relative weights.

Another example of attribute data that the system administrator may set would be based on the past evidence of usefulness of video data coming from each camera. For example, a camera that has been useful in the past for detecting, preventing, or prosecuting crimes would be assigned a higher weight by the system administrator using this user interface.

After the meta-data has been stored in the meta-data storage module, the meta-data may be used to significantly enhance search and retrieval of the video data. That is, in order to perform a search of the video data, the meta-data may be searched first, and the video data may be indexed by the meta-data.

For example, suppose meta-data was recorded in the meta-data storage module during detection of a motion event in a particular camera. If at a later time it were desired to locate all places in the video data where motion was detected, a database query would be performed on the meta-data table to retrieve all events where motion was detected. The pointers to the video data and the indices into the video data would provide a mechanism by which to retrieve the video data that corresponds to those occurrences of motion.

Figure 4:
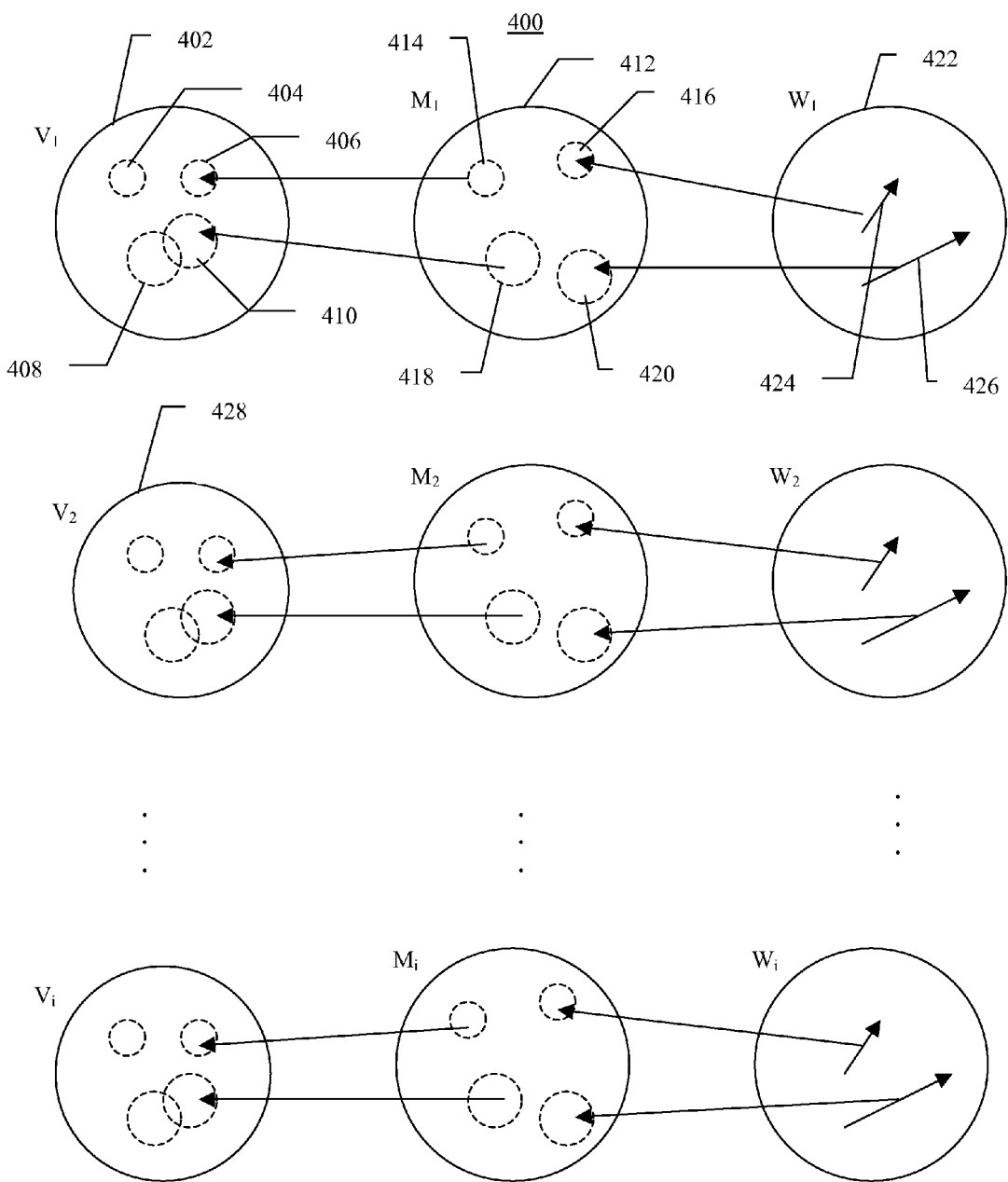
FIG. 4 illustrates a mathematical representation of an illustrative operation of the present invention.

FIG. 4 shows a possible set-theoretic explanation of the operation of the present invention. Consider the sets of video data $V_1, V_2, \ldots, V_i$ shown as elements 402, 428 in FIG. 4 respectively. Sets $V_1$ (element 402) and $V_2$ (element 428) represent video data from camera 1 and camera 2, respectively, and so on. Each set of video data $V_i$ has subsets of video data, for example, subsets for a particular date range, for a particular time range, for a particular event, etc. For example, video set 402 has subsets of video data identified as elements 404, 406, 408, and 410 in FIG. 4.

Each set of video data $V_i$ has a corresponding set of meta-data $M_i$ associated with it. Each element in the set of meta-data $M_i$ has an index, or a pointer, to a corresponding portion of the video data $V_i$. For example, meta-data set $M_1$, shown as element 412 in FIG. 4, has corresponding subsets of meta-data, shown as element 414, 416, 418, and 420. Each subset of meta-data is indexed, or points to, a corresponding subset of video data. For example, subset 414 of meta-data $M_1$ is indexed, or points to, subset 406 of video data $V_1$ from camera 1 (not shown). Note that a one-to-one relationship between video data and meta-data is illustrated in FIG. 4 for clarity. The relationship between video-data and meta-data is not restricted to being one-to-one. The relationship may be one-to-many, many-to-one, as well as many-to-many.

In addition, sets $W_i$ of attribute weight data are weight vectors associated with each set of meta-data $M_i$ for camera i (not shown). The sets $W_i$ of attribute weight data are sets of vectors $w_{i,j}$ which represent weights associated with subsets of the meta-data $M_i$. For example, weight vector $w_{i,j}$ represented as element 424, represents the weights associated with meta-data subset 416. The weight vectors $w_{i,j}$ may be n-dimensional vectors representing the weights in one of a number of dimensions, each dimension representing a weight in a particular attribute of the data. For example, a 2-dimensional weight $[w_{11}, w_{12}]$ vector may represent the attribute weights associated with the reliability of a particular video camera for both motion detection reliability as well as gunshot detection reliability. One camera may have high motion detection reliability and low gunshot detection reliability, while another camera may have high gunshot detection reliability and low motion detection reliability. In principle, the attribute weight vectors $w_{ij}$ may be arbitrarily fine-grained with respect to subsets of the meta-data and subsets of the video data. In practice, attribute weight vectors $w_{ij}$ are constant over large subsets of the meta-data and the video data, and may have large discontinuities between subsets. For example, gunshot detection devices may have a very low motion detection reliability weight, and very high gunshot detection reliability, and vice versa for typical motion detection cameras.

The set-theoretic described has been shown and described here for ease of understanding and explanation of the present invention. The meta-data and video data may or may not be stored as sets; the data may be stored in matrices, tables, relational databases, etc. The set description is shown for clarity only. The present invention is not limited to this particular mathematical representation, and one of ordinary skill will recognize numerous alternative and equivalent mathematical representations of the present invention.

For example, a possible query to retrieve those events in which motion was detected would be:

SELECT ALL EVENTS WHERE MOTION=TRUE (1)

Query (1) would retrieve all events where motion was detected. In the set-theoretic notation described above, the query (1) would correspond to:

$\forall x_j \epsilon V_i | M_{i,j}(\text{motion=true})$ (2)

In order to view the video data corresponding to a particular event, a possible query would be:

VIEW EVENT 1 WHERE MOTION=TRUE (3)

Similar queries could be used to retrieve other events. For example, in order to retrieve all events in which a gunshot was detected, a possible query would be:

SELECT ALL EVENTS WHERE GUNSHOT=TRUE (4)

Query (4) would be represented in set-theoretic notation as:

$\forall x_j \epsilon V_i | M_{i,j}(\text{gunshot=true})$ (5)

To view the first 3 events where gunshots were detected, a possible query would be:

VIEW EVENT 1-3 WHERE GUNSHOT=TRUE (6)

Another possible query, to search for all video data where three or more people were detected in a single frame, a possible query would be:

SELECT ALL EVENTS WHERE NUMBER_OF_PEOPLE>=3 (7)

Query (7) would be represented in set-theoretic notation as:

$\forall x_j \epsilon V_i | M_{i,j}(\text{number\_of\_people} \geq 3)$ (8)

Similarly, in order to view the video data corresponding to the first two events where three or more people were detected, a possible query would be:

VIEW EVENT 1-2 WHERE NUMBER_OF_PEOPLE>=3 (9)

Event searches may be restricted by particular locations or date-ranges. For example, a security analyst may only wish to search a particular camera, or location, where 3 or more people were detected, for example:

SELECT ALL EVENTS WHERE NUMBER_OF_PEOPLE>=3 IN CAMERA 1 (10)

Query (10) would be represented in set-theoretic notation by restricting the search to $V_1$ (video data from camera 1) as follows:

$$\forall x_j \in V_1 | M_{1,j}(\text{number\_of\_people} \geq 3) \quad (11)$$

The security analyst may also restrict searches by date and/or time. For example, the security analyst may only wish to search a particular date range where 3 or more people were detected, for example:

SELECT ALL EVENTS WHERE NUMBER_OF_
PEOPLE>=3 ON 05-15-2007 (12)

Query (12) may be represented in set-theoretic notation as:

$$\forall x_j \in V_i | \{M_{i,j}(\text{number\_of\_people} \geq 3) \cap M_{i,j} \\ (\text{date}=20070515)\} \quad (13)$$

Combinations of events may also be searched. For example, a security analyst may want to search historical video data for all occurrences where a gunshot was detected at the same time as 3 or more people were detected in the video frame. A possible query to accomplish this would be:

SELECT ALL EVENTS WHERE GUNSHOT=TRUE
AND NUMBER_OF_PEOPLE>=3 (14)

Query (14) may be represented in set theoretic notation as:

$$\forall x_j \in V_i \{M_{i,j}(\text{number\_of\_people} \geq 3) \cap M_{i,j} \\ (\text{gunshot}=\text{true})\} \quad (15)$$

Any number of combinations and sub-combinations of events may be searched using the query language, including unions and intersections (conjunctions and disjunctions) of events using AND/OR operators, as well as other logical operators.

Events may also be correlated and analyzed across multiple cameras, or multiple locations. For example, a security analyst may want to see all events where 1 or more people were detected in a particular lobby, and a gunshot was heard in a parking lot camera. To perform such a search, the security analyst could search by:

SELECT ALL EVENTS WHERE NUMBER_OF_
PEOPLE>=1 IN LOBBYCAMERA1 AND
GUNSHOT=TRUE IN PARKINGCAMERA3 (16)

Query (16) may be interpreted in set-theoretic notation as:

$$\forall x_j \in V_1 \cup V_3 | \{M_{1,j}(\text{number\_of\_people} \geq 3) \cap M_{3,j} \\ (\text{gunshot}=\text{true})\} \quad (17)$$

The security analyst is not required to using a query language. A query language may be used for sophisticated searches. For more basic searches, a user interface is provided for the security analyst, which allows the officer to select the meta-data criteria by which to search by using a visual tool. The user interface automatically generates the query language and sends it to the meta-data server for retrieval.

A possible structured query language was shown here. However, the present invention is not limited to the query language shown or described here. Any number of query languages are within the scope of the present invention, including SQL, IBM BS12, HQL, EJB-QL, Datalog, etc. The query languages described here is not meant to be an exhaustive list, and are listed here for illustrative purposes only.

When performing queries on meta-data, such as unions and intersections, attribute weights may be recalculated. For example, to recalculate the attribute weights for an intersection of two subsets of meta-data, the attribute weights would be multiplied together, as shown:

$$W(M_1 \cap M_2) = W(M_1) \cdot W(M_2), \quad (18)$$

For example, to calculate the weight associated with two motion events occurring substantially simultaneously, where the first motion event has a reliability of 90% (0.90), and the second motion event has a probability of 50% (0.50), the weight associated with both motion events substantially simultaneously is 45% (0.45).

To recalculate the attribute weights for a union of two subsets of meta-data, the law of addition of probabilities would be applied, as shown:

$$W(M_1 \cup M_2) = W(M_1) + W(M_2) - W(M_1) \cdot W(M_2) \quad (19)$$

For example, to calculate the weight associated with either one of two motion events occurring substantially simultaneously, where the first motion event has a reliability of 90% (0.90), and the second motion event has a probability of 50% (0.50), the weight associated with either one of the events occurring substantially simultaneously is 95% (0.95).

One embodiment of the present invention allows real-time alerts to be issued based on the present and historical video data, and especially the present and historical meta-data. A correlation engine correlates meta-data, both present and historical, across multiple sensory devices and multiple locations, and activates one or more actions in response to the correlation exceeding a particular threshold. The correlation engine may evaluate various rules, such as "issue an alert to person A when one or more people are present in location B AND a gunshot was detected in location B in the past 24 hours." Video detection components are used to extract relevant meta-data (also called video parameters), from the video sources; the meta-data is input into the correlation engine. Input components may be used to receive inputs from other systems, for example sensory devices, such as temperature probes. Action components represent various actions that may be taken under certain conditions, and may be activated by the correlation engine. Finally, service components provide interfaces for services performed by human beings, for example meta-data addition by human operators.

Figure 5:
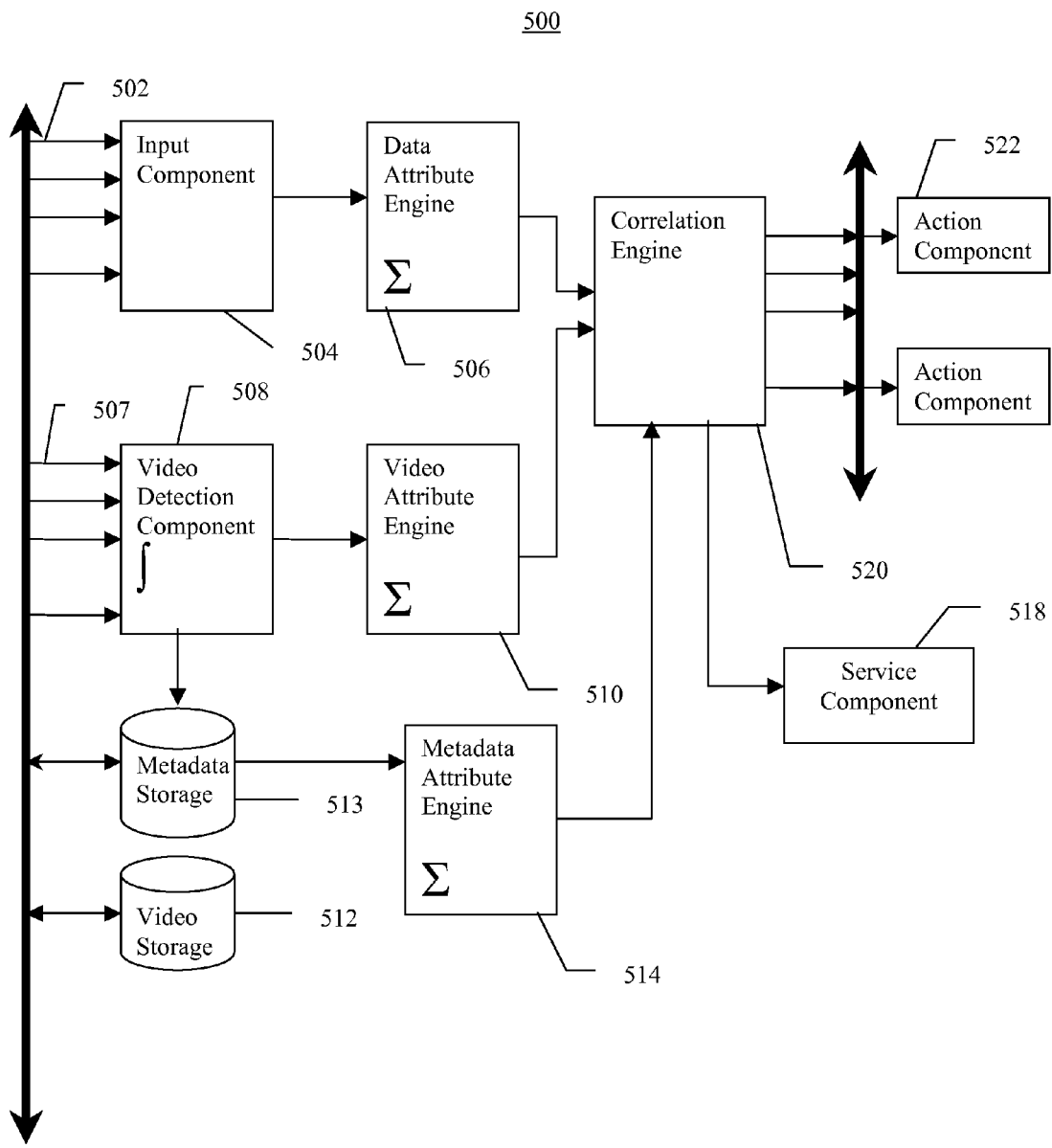
FIG. 5 illustrates a system architecture for intelligent alerting based on meta-data, according to another embodiment of the present invention.

In one embodiment, illustrated in FIG. 5, past and present video data, past and present meta-data, and past and present data from sensory devices are used to generate real-time alerts. One or more data inputs 502 are received via one or more input components 504 (only one input component is illustrated for clarity). The data inputs could be data from police reports, anonymous tips, sensory devices, etc. In one embodiment, data inputs could come from a personnel database in storage and from temperature probe (not shown). The input components, such as input component 504, provide interfaces between the system 500 and various input devices. The data inputs 502 are assigned a weight by data attribute engine based on the attribute associated with the data inputs 506. As described above, the weights may be a function of the input data, the source of the input data (such as its reliability), external events (such as the National Terror alerts in the United States), or any other information. (Only one input data is shown being processed by data attribute engine 506 for clarity.)

One or more video inputs 507 are received and processed by one or more detection components 508 (only one video detection component is illustrated for clarity). The video inputs could be historical, archived video data, such as video from storage 512, or could be video data from live video cameras (not shown). The detection components, such as detection component 508, determine one or more video parameters from the video inputs 507. For example, detection component 508 may detect whether or not there is a person in a particular region of video input 507. The one or more video parameters that are determined by the detection component 508 are assigned a weight by video attribute engine 510. As described above, the weights may be a function of the video data, the video source (such as its reliability), external events (such as the National Terror alerts in the United States), or any other information. (Only one video parameter is shown being processed by video attribute engine 510 for clarity.)

The detection components also store meta-data, which represent events detected by the detection component, in meta-data storage 513. For example, a motion detection component, when detecting motion, stores meta-data indicating that motion was detected in a certain camera in a certain period in meta-data storage 513. The meta-data may be represented and stored in a table as illustrated in FIG. 2, or the meta-data may be stored and represented in some other manner.

The historical meta-data stored in metadata storage 513 is weighted by attribute weights by metadata attribute engine 514. The correlation engine 520 evaluates one or more rules, or triggers, based on the weighted metadata from metadata attribute engine 514.

The weighted input data, the weighted video data, and the weighted meta-data (outputs from the data attribute engine 506, the video attribute engine 510, and the metadata attribute engine 514) are processed by correlation engine 520. Correlation engine 520 evaluates a set of rules based on the weighted input data, the weighted video data, and the weighted meta-data. The correlation engine may also be considered to correlate two or more events together. The correlation engine 520 activates one or more actions via one or more action components 522. For example, the correlation engine 520 may contain a rule stating: "Issue an alert to the Police (Action Component 1) if ten or more people gather in a given area (Video Detection Component 1) and within the last 48 hours there was a gunshot detected in that area (historical Metadata 1)." If the preconditions of the rule are satisfied, the action is performed. As discussed previously, the preconditions may be weighted based on the data, the source of the data, external events, and other information. For example, a more recent shooting may receive a higher weight than an older shooting.

In FIG. 5, data may also come from a service component 518. Service components, such as service component 518, are interfaces to human operators. For example, a service component may provide an interface for human operators to monitor a given area for suspicious activity, and to send a signal to the correlation engine 520 that suspicious activity is going on in a given area. The correlation engine 520 will activate an action if a corresponding rule is activated. Alternatively, the human operator may force an action to be performed by directly activating an action component, such as action component 522.

Equations 20 to 22 show possible rules that may be evaluated by correlation engine 520. For example, as shown in Eq. 20, action component $a_1$ will be activated if the expression on the left-hand side is greater than a predetermined threshold $\tau_1$. In Eqs. 20-22, "a" stands for action component, "f, g, and h" are predetermined functions, "w" stands for weight, "x" stands for the input data, and "v" stands for video data. Eqs. 20-22 could represent a hierarchy of actions that would be activated for different threshold scenarios. Alternatively, Eqs. 20-22 could represent several rules being evaluated in parallel. Eqs. 29-22 are illustrative of only one embodiment of the present invention, and the present invention may be implemented using other equations, other expressions, or even by using heuristic rules rather than equations.

$$a_1 = f_j\left(\sum_{i=1}^{i=n} w_i \cdot x_i\right) + g_j\left(\sum_{i=1}^{i=m} w_i \cdot v_i\right) + h_j\left(\int_{t=1}^{t=t_n} w(v) \cdot v(t)\,dt\right) \geq \tau_1 \quad (20)$$

$$a_2 = f_j\left(\sum_{i=1}^{i=n} w_i \cdot x_i\right) + g_j\left(\sum_{i=1}^{i=m} w_i \cdot v_i\right) + h_j\left(\int_{t=1}^{t=t_n} w(v) \cdot v(t)\,dt\right) \geq \tau_2 \quad (21)$$

...

$$a_j = f_j\left(\sum_{i=1}^{i=n} w_i \cdot x_i\right) + g_j\left(\sum_{i=1}^{i=m} w_i \cdot v_i\right) + h_j\left(\int_{t=1}^{t=t_n} w(v) \cdot v(t)\,dt\right) \geq \tau_j \quad (22)$$

Equation 23 shows an example of a calculation of determining a weight that may be performed by data attribute engine 506, video attribute engine 510, or metadata attribute engine 514. The weight "w" may be based on attribute data, including the source of the data "s" (for example, the reliability of the source), the time that the data was received "t" (for example, older data would be assigned a lower weight), and the frequency that the data was received "f" (for example, the same data received multiple times would be assigned a higher weight). Other weighting factors may also be used, and the weighing factors described here are illustrative only and are not intended to limit the scope of the invention.

$$w_i = s_i \cdot t_i \cdot \ldots \cdot f_i \quad (23)$$

Equation 24 shows an example of a calculation that may be performed by detection component 508 to determine a video parameter "$v_i$" from the video data "v(t)". Eq. 24 shows a video stream "v(t)" weighted by a weighting function "w(v)" and integrated over time from time t=1 to t=$t_n$. The video parameter "$v_i$" may be obtained as a function "$f_i$" of the integral. For example, a detection component for counting the number of people that enter a region over a period of time may perform face detection in a given frame, count the number of faces detected, and then integrate over several frames to obtain a final count.

$$v_i = f_i\left(\int_{t=1}^{t=t_n} w(v) \cdot v(t)\,dt\right) \quad (24)$$

In one embodiment, the function "$f_i$" of Eq. 24 may be a composition of several functions, as shown in Equation 25. For example, a detection component may count the number of people wearing a safety helmet that enter a given area by composing a safety helmet detection function with a people counting function.

$$f_i = f_1 \cdot f_2 \cdot \ldots \cdot f_n \quad (25)$$

In one embodiment, the new, or future, weights "$w_j$" may be based on the past weights "$w_i$" and external events "$e_i$". Examples of external events could be "Amber Alerts" for missing children, "National Terror Alerts" for terrorist activity in the United States, etc. Eq. 26 shows an example of a calculation for determining new, or future, weights "$w_j$" by composing a matrix of past weights "$w_i$" with external events "$e_i$".

$$\begin{bmatrix} w_1 \\ w_2 \\ \ldots \\ w_j \end{bmatrix} = [e_1, e_2, \ldots, e_n] \cdot \begin{bmatrix} w_1 \\ w_2 \\ \ldots \\ w_i \end{bmatrix} \quad (26)$$

Figure 6:
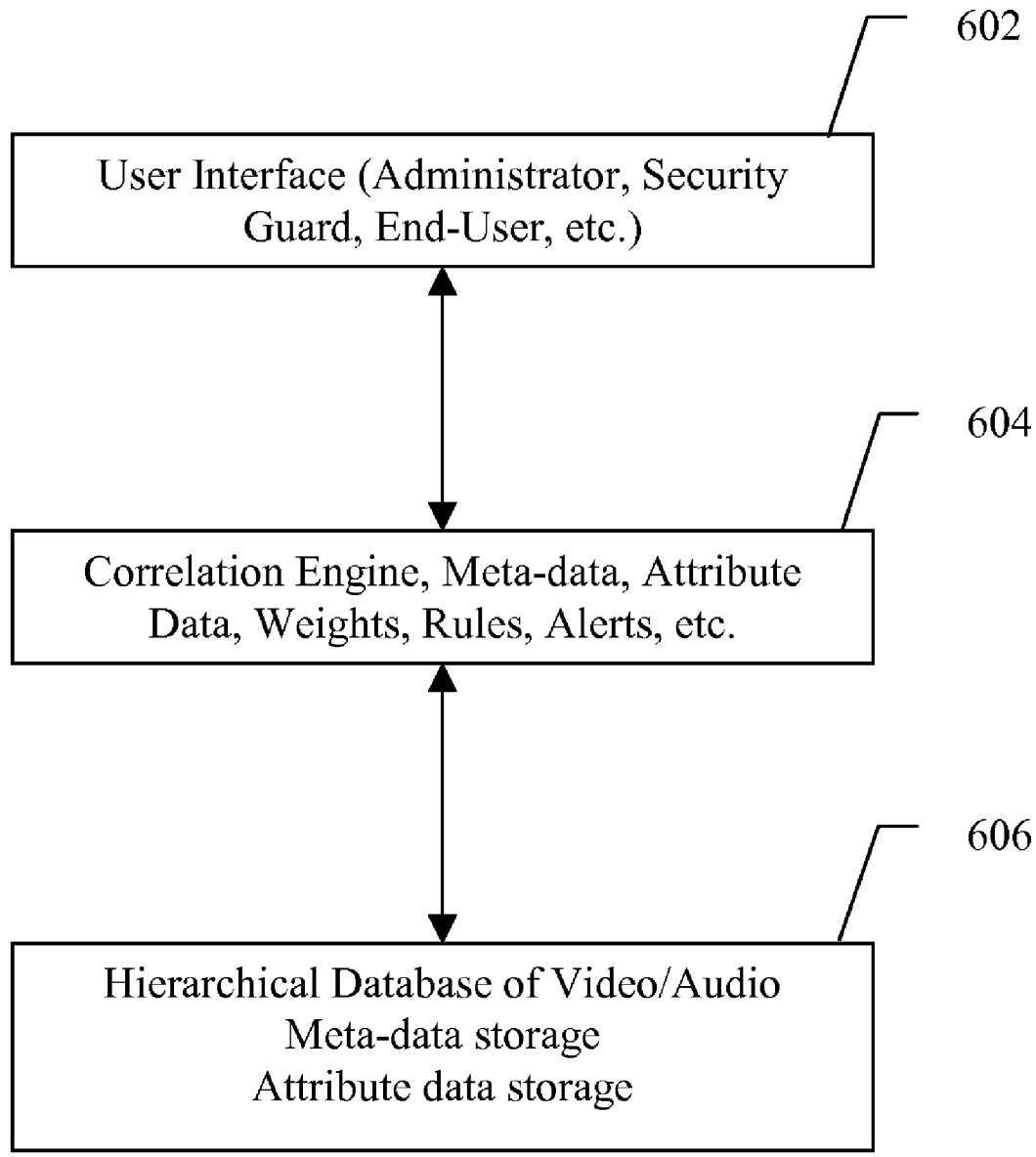
FIG. 6 illustrates a software architecture used with one embodiment of the present invention.

FIG. 6 shows an example of software architecture 600 of one embodiment of the present invention. A presentation layer 602 provides the front-end interface to users of the system 100 of FIG. 1. Several user interfaces are provided. For example, a user interface is provided for an administrator, who can modify various system parameters, such as the data input components, the detection components, the data and video weights, the rules, as well as the action components.

Another user interface is provided for an officer, such as a security guard, to monitor the activity of the system 100. For example, a user interface for the security officer would allow the officer to monitor alerts system-wide, turn on and off appropriate cameras, and notify authorities. An interface is also provided for an end-user, such as an executive. The interface for the end-user allows, for example, the end-user to monitor those alerts relevant to him or her, as well as to view those cameras and video sources he or she has permission to view. Various user interfaces may be created for various users of the present invention, and the present invention is not limited to any particular user interface shown or described here. Other user interface screens, for adding meta-data and for modifying attribute data, were discussed above.

A middle layer 604 provides the middleware logic for the system 100. The middle layer 604 includes the weight engines 506, 510 as well as the correlation engine 520 of FIG. 5. The middle layer interfaces with the user interface 602 and evaluates the logic of Equations 20-26.

A database layer 606 is provided for storing the input data and the video data. In one embodiment, the database layer 606 may be implemented using a hierarchical storage architecture, in which older data, or less frequently used data, is migrated to slower and less expensive storage media. The database layer 606 provides the input data and the video data to the middle layer 604, which in turn processes the data for display by the presentation layer 602.

Figure 7:
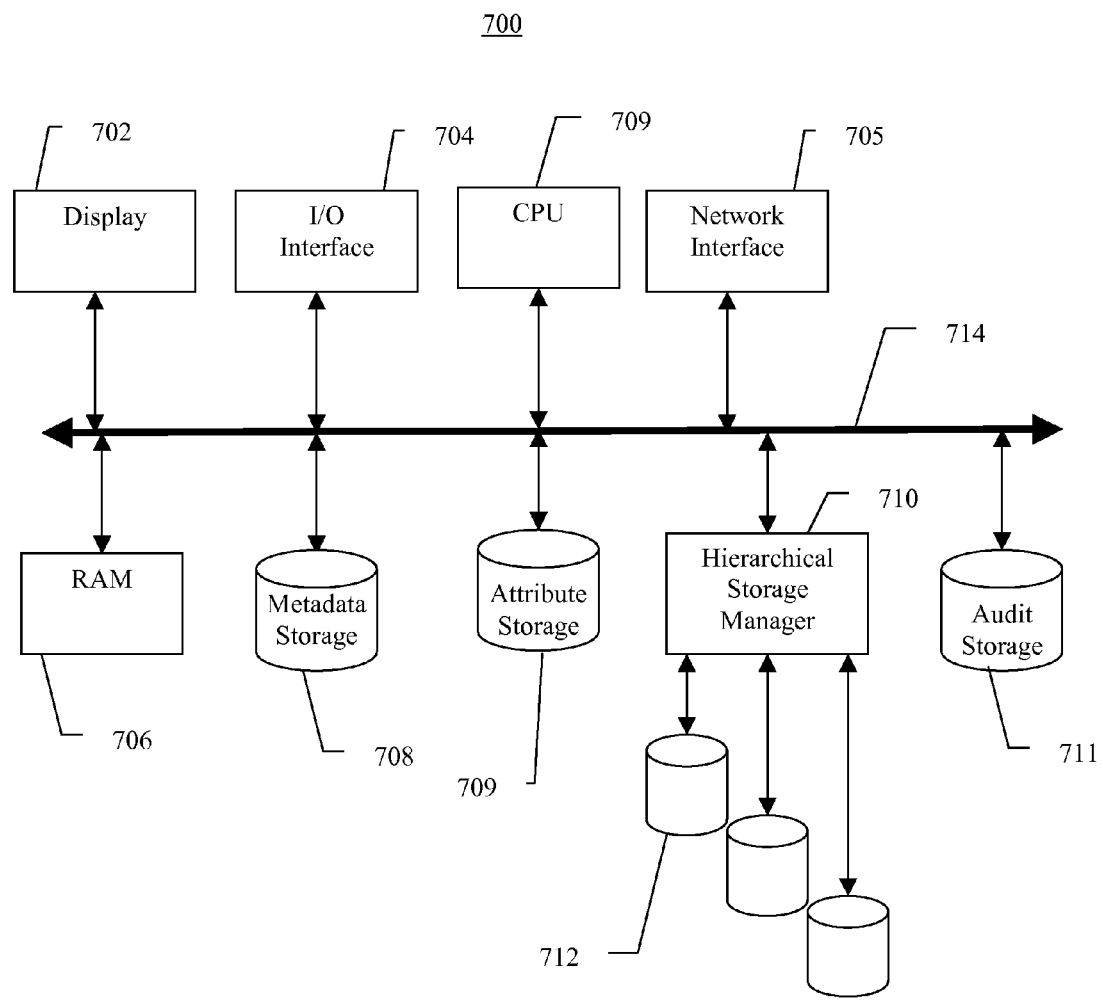
FIG. 7 illustrates a hardware architecture used with one embodiment of the present invention.

FIG. 7 shows an example of hardware architecture 700 of one embodiment of the present invention. The software architecture 600 may be implemented using any hardware architecture, of which FIG. 7 is illustrative. A bus 714 connects the various hardware subsystems. A display 702 is used to present the output of the presentation layer 602 of FIG. 2. An I/O interface 704 provides an interface to input devices, such as keyboard and mouse (not shown). A network interface 705 provides connectivity to a network, such as an Ethernet network, a Local Area Network (LAN), a Wide Area Network (WAN), an IP network, the Internet, etc. RAM 706 provides working memory while executing a process according to system architecture 100 of FIG. 1. Program code for execution of a process according to system architecture 100 of FIG. 1 may be stored on a hard disk, a removable storage media, a network location, or other location (not shown). CPU 709 executes program code in RAM 706, and controls the other system components. Meta-data is stored in metadata storage module 708, and attribute data is stored in attribute storage module 709. Hierarchical storage manager 710 provides an interface to one or more storage modules 712 on which video data is stored. Audit information, including data about who, when, and how often someone accessed particular video data is stored in audit storage module 711. As stated previously, the separation between meta-data storage, attribute storage, and video storage is logical only, and all three storage modules, or areas, may be implemented on one physical media, as well as on multiple physical media. It is to be understood that this is only an illustrative hardware architecture on which the present invention may be implemented, and the present invention is not limited to the particular hardware shown or described here. It is also understood that numerous hardware components have been omitted for clarity, and that various hardware components may be added without departing from the spirit and scope of the present invention.

Figure 8:
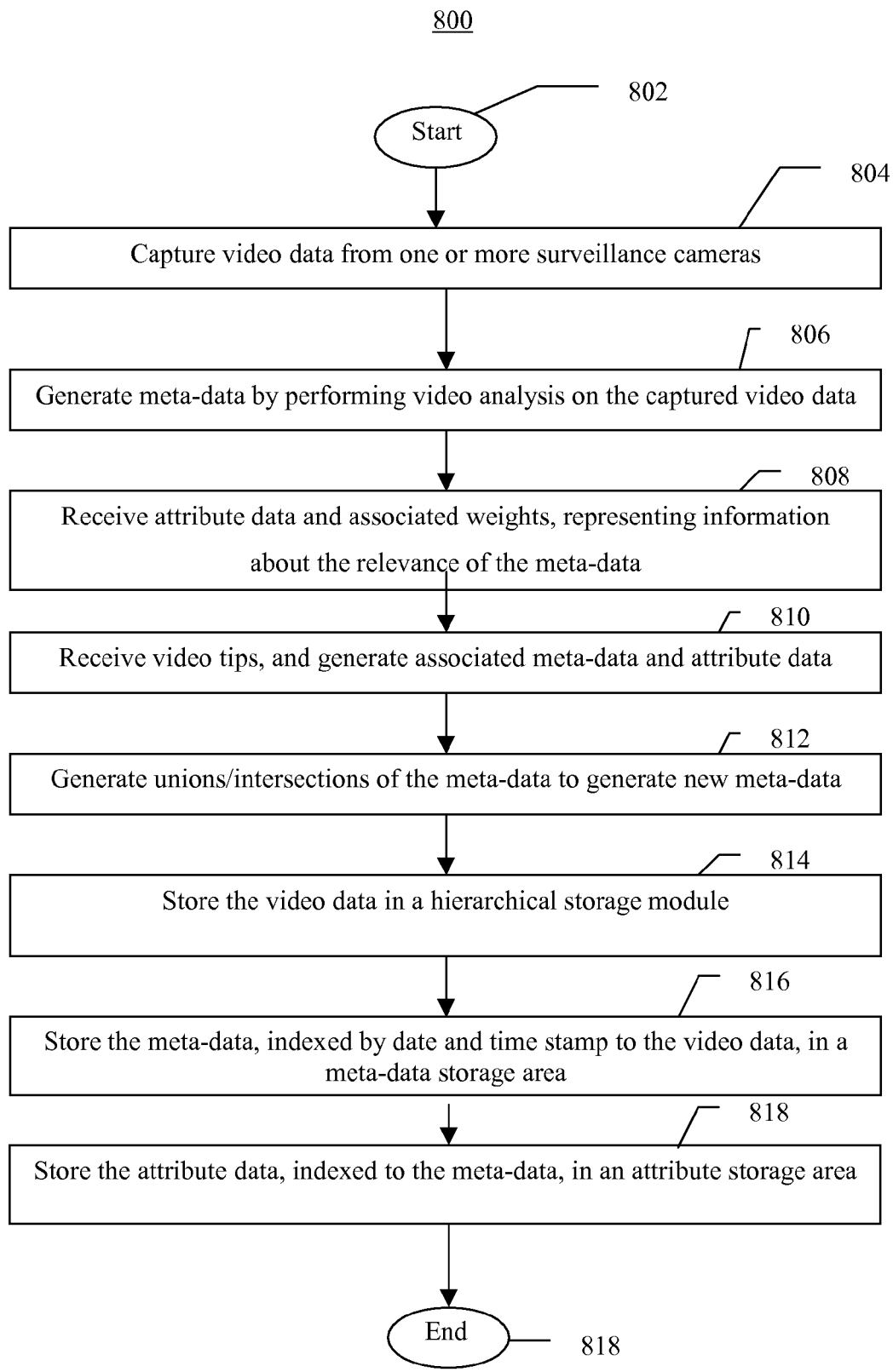
FIG. 8 illustrates a flowchart of a process for storing video data and associated meta-data and attribute data according to one embodiment of the present invention.

FIG. 8 shows a flowchart of a process for storing video data according to one embodiment of the present invention. Process 800 begins in step 802. Video data is captured from one or more surveillance cameras, as shown in step 804. Meta-data is generated by performing video analysis on the captured video data, as shown in step 806. Attribute data and associated weights, representing information about the relevance of the meta-data, are received, as shown in step 808. Optionally, a video tip may be received from a well-meaning citizen, and associated meta-data and attribute data may be received or generated, as shown in step 810. Unions and intersections of meta-data may be used to generate additional meta-data, as shown in step 812. The video data is stored in a hierarchical storage module, as shown in step 814. The meta-data, indexed by date and time stamp to the video data, is stored in a meta-data storage module, as shown in step 816. Attribute data, indexed to the meta-data, is stored in an attribute storage area, as shown in step 818. Process 800 ends in step 818.

Figure 9:
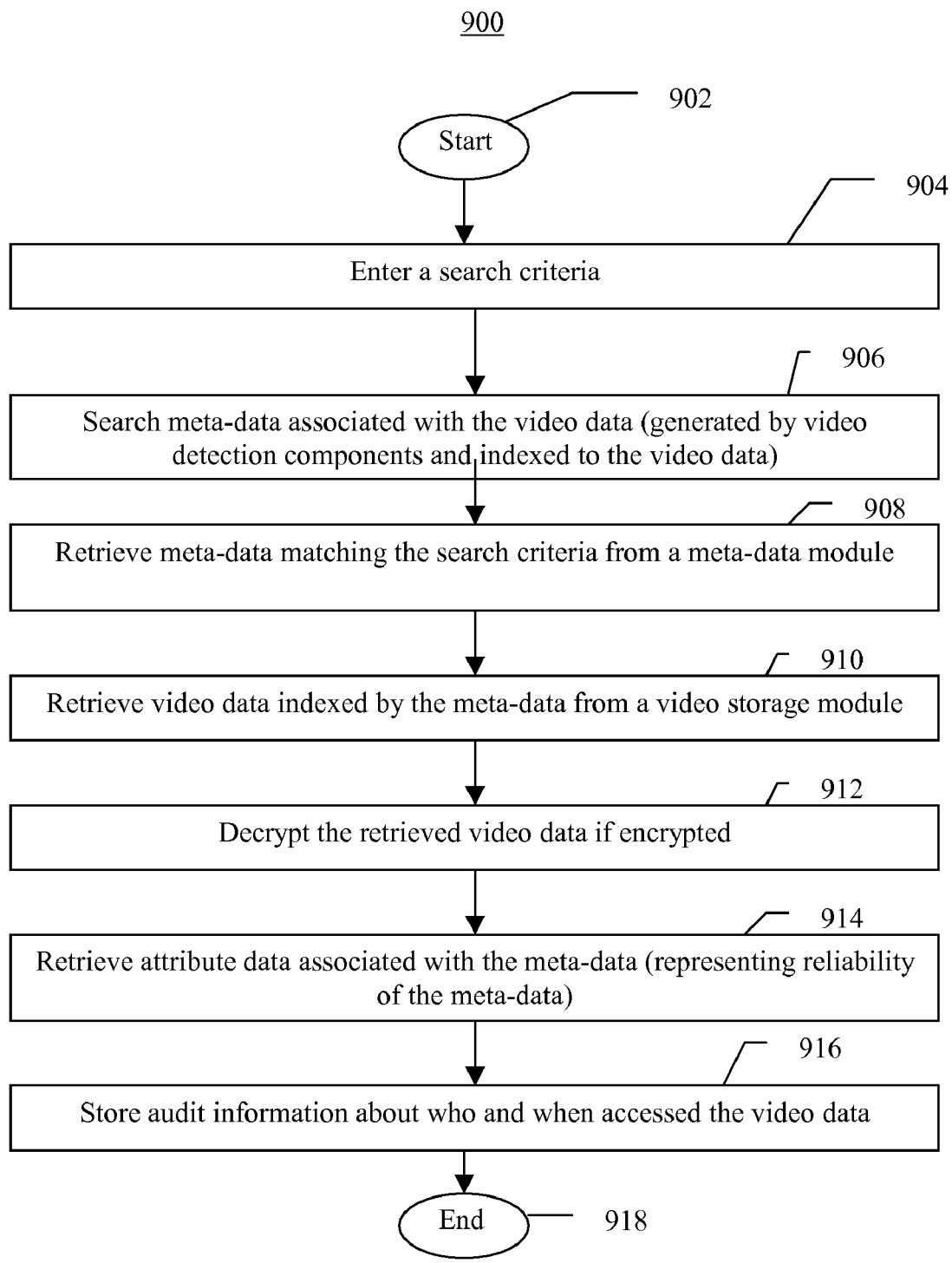
FIG. 9 illustrates a flowchart of a process for retrieving video data and associated meta-data and attribute data according to another embodiment of the present invention.

FIG. 9 shows a flowchart of a process for retrieving video data and associated meta-data and attribute data according to another embodiment of the present invention. Process 900 begins in step 902. A search criteria is entered, as shown in step 904. Meta-data, which was previously generated by video detection components and indexed to the video data, is searched, as shown in step 906. Meta-data matching the search criteria is retrieved from a meta-data storage module, as shown in step 908. Video data, indexed by the meta-data by date and time, is retrieved from the video data storage module, as shown in step 910. If the video data was encrypted, the video data is decrypted as shown in step 912. Attribute data, representing reliability of the meta-data, is retrieved from the attribute data storage module, as shown in step 914. Audit information may be stored about who and when accessed the video data, as shown in step 916. Process 900 ends in step 918.

Figure 10:
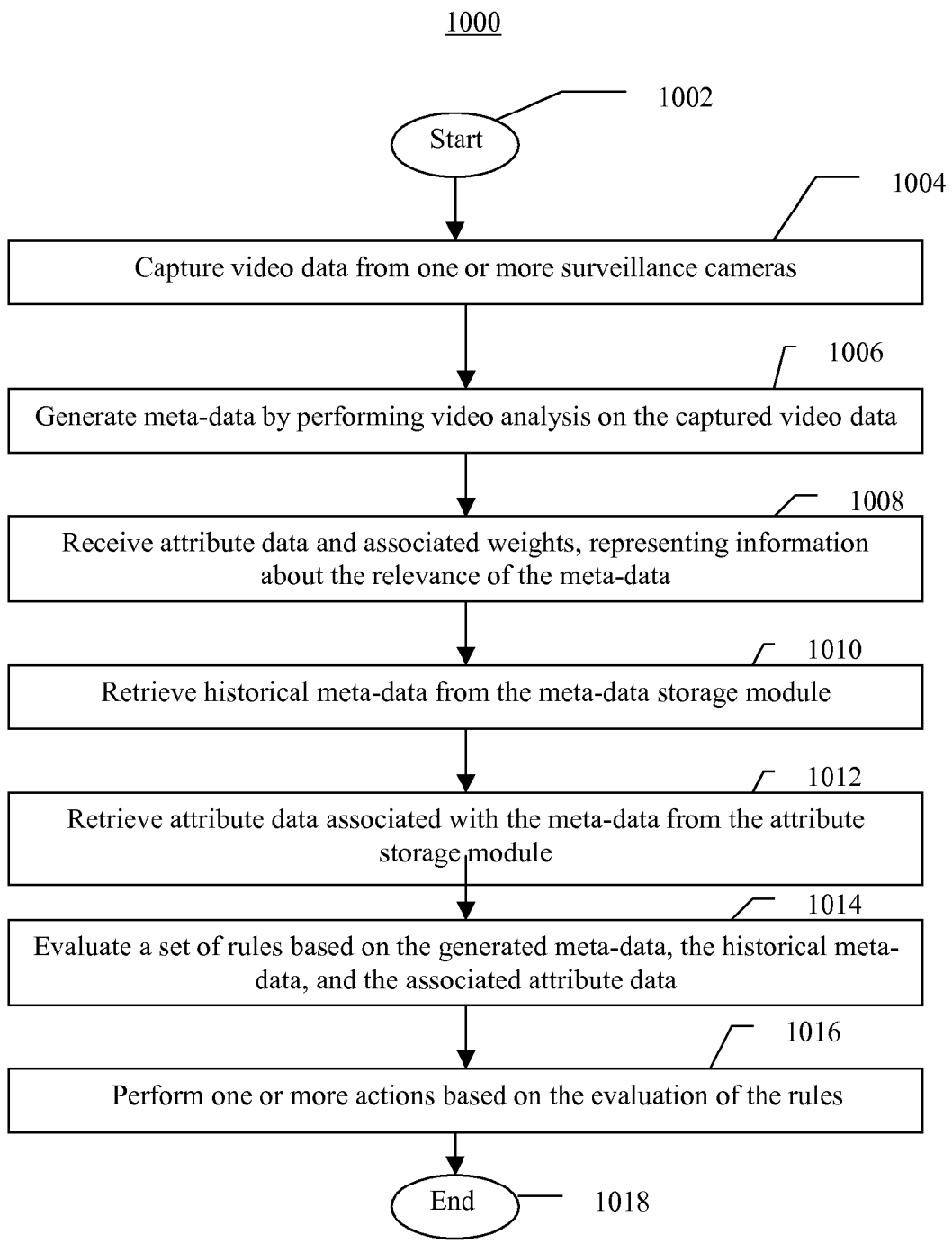
FIG. 10 illustrates a flowchart of a process for intelligent alerting based on past and present meta-data according to yet another embodiment of the present invention.

FIG. 10 shows a flowchart of a process for intelligent alerting based on past and present meta-data according to yet another embodiment of the present invention. Process 1100 may be stored in RAM 706, and may be executed on CPU 709 of FIG. 7. Process 1000 begins in step 1002. Video data is captured from one or more surveillance cameras, as shown in step 1004. Meta-data is generated by performing video analysis on the captured video data, as shown in step 1006. Attribute data and associated weights, representing information about the relevance of the meta-data, are received, as shown in step 1008. Historical meta-data is retrieved from a meta-data storage module, as shown in step 1010. Attribute data associated with the meta-data is retrieved from an attribute storage module, as shown in step 1012. A set of rules is evaluated based on the generated meta-data, the historical meta-data, and the associated attribute data, as shown in step 1014. One or more actions, which could include issuing an alert, is performed based on the evaluation of the rules, as shown in step 1016. Process 1000 ends in step 1018.

Figure 11:
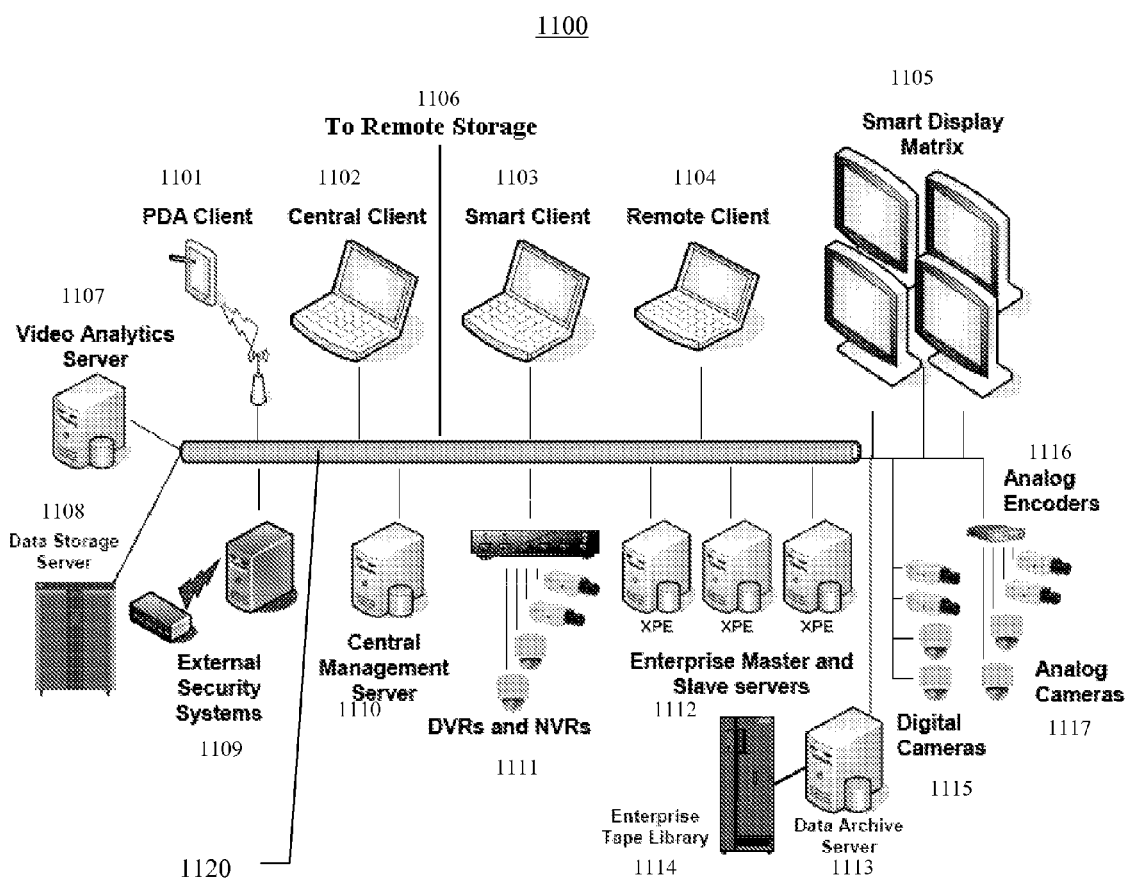
FIG. 11 illustrates another example of a hardware architecture according to one embodiment of the present invention.

FIG. 11 shows another example of a hardware architecture 1100 according to another embodiment of the present invention. A network 1120, such as an IP network over Ethernet, interconnects all system components. Digital IP cameras 1115, running integrated servers that serve the video from an IP address, may be attached directly to the network. Analogue cameras 1117 may also be attached to the network via analogue encoders 1116 that encode the analogue signal and serve the video from an IP address. In addition, cameras may be attached to the network via DVRs (Digital Video Recorders) or NVRs (Network Video Recorders), identified as element 1111. The video data is recorded and stored on data storage server 1108. Data storage server 1108 may be used to store the video data, the meta-data, as well as the attribute data and associated weights. Data is also archived by data archive server 1113 on enterprise tape library 1114. Data may also be sent to remote storage 1106 via a dedicated transmission media such as a fiber optic line, or via a public network such as the Internet.

Legacy systems, such as external security systems 1109, may be interfaced via appropriate input components, as described above. A central management server 1110 manages the system 1100, provides system administrator, access control, and management functionality. Enterprise master and slave servers 1112 provide additional common system functionality. Video analytics server 1107 runs the video detection modules described below, as well as providing the interface to search, retrieve, and analyze the video data and meta-data stored on data server 1108.

The video, including live feeds, as well as recorded video, may be viewed on smart display matrix 1105. The display matrix includes one or more monitors, each monitor capable of displaying multiple camera or video views simultaneously. One or more clients are provided to view live video data, as well as to analyze historical video data. Supported clients include PDA 1101, central client 1102, and smart client 1103. A remote client 1104 may be connected remotely from anywhere on the network or even over the public Internet, due to the open IP backbone of the present invention.

One embodiment of the present invention allows for the receipt and storage of "video tips," which are short video clips captured by well-intentioned citizens. Video tips would be received by the present invention via a user interface. For example, a person would log into the system via the Internet and upload a video of a crime that the person caught on video. The system would process the video tip in a manner analogous to the way it would process video from a surveillance camera. The video detection components would be used to detect one or more events in the video, such as motion, people counting, etc., and generate meta-data about the video tip. In addition, the citizen submitting the video tip would also submit associated meta-data, such as the date and time it was captured, its relevance, the names of people in the video, the occurrence of any crime in the video, etc.

Attribute data would be assigned to the video tip based on such factors as the identify of the informant, the quality of the video, the reliability of the source, other tips that are coming in, etc. Once the video tip has entered the system, it is processed in a similar manner to the way video data from the surveillance cameras is processed, as detailed above. The video tip would be archived in the video storage module, and its associated meta-data and attribute data would be stored. It would serve as one additional input into the correlation engine and will be weighted and factored in when generating alerts. In addition, it will be available for later search and retrieval by its associated meta-data and attribute data.

According to the present invention, various detection components may be used to generate meta-data, or video parameters, from the video inputs. These detection components may be configured to record meta-data along an occurrence of each event. For example, as shown in FIG. 2, whenever a motion event is detected, meta-data corresponding to the motion event is recorded along with the video data. In another example, if a person is detected in an area by a face detection component, meta-data may be stored along with each occurrence of that person in the video. Some illustrative detection components are listed below. However, the present invention is not limited to these detection components, and various detection components may be used to determine one or more video parameters (meta-data), and are all within the scope of the present invention.

1. Detect presence of intruder in designated area
2. Detect presence of intruder in designated area during designated time
3. Detect whether it is a person in designated area (excluding pets, wind, etc.)
4. Detect number of people in designated area
5. Detect if more people entered a designated area than left the designate area
6. Detect voice (sound) volume
7. Recognize certain sound patterns, such as gunshots or shouts
8. Detect certain key words
9. Detect speed of motion of an object
10. Detect size of object
11. Detect area of motion
12. Detect acceleration
13. Detect if person is too short in designated area
14. Detect if person is too long in designated area
15. Detect a face
16. Recognize a certain face
17. Detect object left in a given area for a certain period of time
18. Count number of vehicles
19. Detect if vehicle crossed lane
20. Detect if vehicles is driving the wrong way in a lane
21. Determine type of vehicle
22. Detect license plate of vehicle
23. Detect percent of lane occupied
24. Detect speed of vehicle Additionally, various sensory devices may be integrated into system 100 of FIG. 1 by adding an input component for receiving and processing the input from the sensory device. Some illustrative input components are listed below. However, the present invention is not limited to these input components, and various other input components associated with various other sensory and other devices are within the scope of the present invention.

1. Measure temperature
2. Measure pressure
3. Measure height
4. Measure speed
5. Measure revolutions per minute
6. Measure blood pressure
7. Measure heart rate
8. Measure RFID signal
9. Measure chlorine level
10. Measure radon level
11. Measure dust particle level
12. Measure pollution level
13. Measure $CO_2$ emission level
14. Measure bacteria level in water
15. Measure water meter
16. Measure electrical meter As described above, various action components may be used to perform one or more actions in response to a rule being activated. The rules engine may activate one or more action components under certain conditions defined by the rules. Some illustrative action components are listed below. However, the present invention is not limited to these particular action components, and other action components are within the scope of the present invention.

1. Send email alert to designated person
2. Send SMS alert to designed phone number
3. Send message to designated blackberry
4. Send alert to public address system
5. Send message or picture to police
6. Send alert email to mass mailing list
7. Send text message (SMS) to mass list
8. Send alert to PC or PocketPC
9. Call designated phone
10. Turn lights on or off in designated area
11. Turn thermostat up or down
12. Turn camera on or off
13. Issue a forced alerts (with automatic escalation if no response)

14. Follow a person using Pan-Zoom-Tilt (PTZ) camera

15. Follow a person from camera to camera

According to the present invention, service components may be used to integrate human intelligence into system 500 of FIG. 5. For example, a service component may provide a user interface for remote security guards who may monitor the video inputs. Some illustrative examples of what the security guards could monitor for and detect is listed below. A human operator may detect some events, such as "suspicious behavior," which may be difficult for a computer to detect. The human operators may also add meta-data for each occurrence of an event. For example, a security guard may add meta-data to each portion of a video where he or she noticed suspicious activity. The present invention is not limited to the examples described here, and is intended to cover all such service components that may be added to detect various events using a human operator.

1. Detect people going into building but not coming out
2. Detect people carrying packages in and not carrying out
3. Detect people carrying packages out but not carrying in
4. Detect people wearing different clothes
5. Detect people acting suspiciously
6. Detect people carrying guns
7. Detect people tampering with locks
8. Detect people being mugged
9. Detect a shooting
10. Detect people being bullied The present invention may be implemented using any number of detection, input, action, and service components. Some illustrative components are presented here, but the present invention is not limited to this list of components. An advantage of the present invention is the open architecture, in which new components may be added as they are developed.

The components listed above may be reused and combined to create advanced applications. Using various combinations and sub-combinations of components, it is possible to assemble many advanced applications.

The following discussion illustrates just one advanced application that may be created using the above components, and describes the occurrence of a real shooting that may have been prevented and the assailants apprehended if the present invention was in use.

On Dec. 16, 2005, in a parking lot on MIT's campus, Professor Donovan, co-author of the present patent application, was shot at in a moving car 14 times at night and was hit 4 times. If the invention described here were in place, the following would have occurred. Surveillance cameras would have detected Professor Donovan entering the building at 8:00 PM, would have stored the video data, and associated meta-data (namely, motion detection), a high weight would be calculated based on the attribute data (an executive swiping in late at night, obtained from the legacy access system). At approximately 8:10 PM, the motion of two men would have been detected in the parking lot. The video data and associated motion meta-data would be stored locally, as well as remotely. The weight associated with the attribute date (motion after 8:00 PM at night) would be high. The correlation engine would retrieve the stored motion meta-data of Professor Donovan entering the building, and the meta-data associated with two men moving in the parking lot, and would have issued an alert to all people, including Professor Donovan, who are still in the building, using their Blackberries or cell phones. The email alert would have contained a picture of the parking lot, and Professor Donovan would not have entered the parking lot and would possibly not have been shot.

Different weights would be associated with the detected method of entrance into the parking lot. For example, if motion was detected in the fence area, this would have a higher weight than motion near the entrance gate. Meta-data that was combined with people loitering at the entrance gate would have a higher weight.

For later (after the crime) criminal and forensic analysis, the video data would have been searched using meta-data for the precise time when those two men entered the parking lot and for all previous occurrences when two men were detected in the parking lot. Hence the assailants may have been identified scoping the area as well as committing the crime of attempted murder, which could have led to a possible identification and capture of the assailants.

Only one example of an illustrative scenario in which the present invention could be applied was described here. However, as will be immediately recognized by one of ordinary skill, the present invention is not limited to this particular scenario. The present invention could be used to help prevent and fight crime, terrorist activity, as well as ensure safety procedures are following by integrating the components described here.

In one embodiment, a system administrator may set the rules. The system administrator may hold an ordered, procedural workshop with the users and key people of the organization to determine the weighing criteria and the alerting levels.

In another embodiment, the rules may be heuristically updated. For example, the rules may be learned based on past occurrences. In one embodiment, a learning component may be added which can recognize missing rules. If an alert was not issued when it should have been, an administrator of the system may note this, and a new rule may be automatically generated. For example, if too many alerts were being generated for motion in the parking lot, the weights associated with the time would be adjusted.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to embodiments thereof, it will be understood by those skilled in the art that various other changes in the form and details may be made without departing from the spirit and scope of the invention.

What is claimed is:

1. A method of storing video data, associated meta-data, and associated attribute weights from a video surveillance system, the method comprising:

capturing video data from one or more surveillance cameras;

generating meta-data by performing video analysis on the video data from the surveillance cameras, the meta-data representing events detected in the video data;

determining attribute weights, representing information about the relevance of the meta-data;

generating intersections of two or more subsets of the meta-data to generate intersection meta-data;

determining attribute weights associated with the intersection meta-data by multiplying the attribute weights for each subset of meta-data;

generating unions of two or more subsets of the meta-data to generate union meta-data;

determining attribute weights associated with the union meta-data by adding the attribute weights for each subset of meta-data and subtracting a multiple of the attribute weights of each subset of meta-data;

changing the attribute weights based on external events by computing future attribute weights from past attribute weights by composing past attribute weights with external event weights;

storing the video data in a video storage area;

storing the meta-data, indexed by date and time stamp to the video data, in a meta-data storage area; and storing the attribute weights in an attribute storage area, wherein attribute weights for the intersection meta-data is calculated using the equation:

$$W(M_1 \cap M_2) = W(M_1) \cdot W(M_2),$$

wherein attribute weights for the union meta-data is calculated using the equation:

$$W(M_1 \cup M_2) = W(M_1) + W(M_2) - W(M_1) \cdot W(M_2), \text{ and}$$

wherein $M_1$ and $M_2$ are two subsets of meta-data, $W(M_1)$ is an attribute weight associated with subset $M_1$, $W(M_2)$ is an attribute weight associated with subset $M_2$, $W(M_1 \cup M_2)$ is a calculated attribute weight associated with the intersection meta-data of subset $M_1$ and subset $M_2$, and $W(M_1 \cup M_2)$ is a calculated attribute weight associated with the intersection meta-data of subset $M_1$ and subset $M_2$.

2. The method of claim 1, wherein the attribute weights are changed based on external events by computing future attribute weights from past attribute weights by composing past attribute weights with external event weights as shown in the equation:

$$\begin{bmatrix} w_1 \\ w_2 \\ \ldots \\ w_j \end{bmatrix} = [e_1, e_2, \ldots, e_n] \cdot \begin{bmatrix} w_1 \\ w_2 \\ \ldots \\ w_i \end{bmatrix},$$

where $w_j$ are future attribute weights, $w_i$ are past attribute weights, and $e_n$ are external event weights.

3. The method of claim 1, further comprising:

receiving video tips from one or more anonymous sources, the video tips being short video clips captured by citizens;

generating tip meta-data based on the video tips, the tip meta-data representing events detected in the video tips; and determining tip attribute weights for the tip meta-data, representing information about the relevance of the tip meta-data.

4. The method of claim 1, further comprising:

providing additional meta-data generated by a human operator; and storing the additional human generated meta-data, indexed to the video data by date and time stamp, in the meta-data storage module.

5. The method of claim 1, further comprising:

retrieving historical meta-data from the meta-data storage module;

evaluating a set of rules based on the historical meta-data and the generated meta-data; and performing one or more actions based on the evaluation of the set of rules.

6. The method of claim 1, wherein the video storage module is a hierarchical storage module that archives the video data based at least on meta-data and attribute weights associated with the video data.

7. The method of claim 1, further comprising:

storing access privileges for the video data, the meta-data, and the attribute weights.

8. The method of claim 1, further comprising:

encrypting the captured video data before storing the video data.

9. The method of claim 1, wherein the video data is stored off-site.

10. A video surveillance system, comprising:

one or more surveillance cameras for capturing video data;

one or more video storage areas for storing video data;

a meta-data storage area for storing meta-data;

an attribute storage area for storing attribute weights; and a processor, the processor coupled to the video storage areas, the meta-data storage area, and the attribute storage area, the processor adapted to execute program code to:

capture video data from one or more surveillance cameras;

generate meta-data by performing video analysis on the video data from the surveillance cameras, the meta-data representing events detected in the video data;

determine attribute weights, representing information about the relevance of the meta-data;

generate intersections of two or more subsets of the meta-data to generate intersection meta-data;

determine attribute weights associated with the intersection meta-data by multiplying the attribute weights for each subset of meta-data;

generate unions of two or more subsets of the meta-data to generate union meta-data;

determine attribute weights associated with the union meta-data by adding the attribute weights for each subset of meta-data and subtracting a multiple of the attribute weights of each subset of meta-data;

change the attribute weights based on external events by computing future attribute weights from past attribute weights by composing past attribute weights with external event weights;

store the video data in a video storage area;

store the meta-data, indexed by date and time stamp to the video data, in a meta-data storage area; and store the attribute weights in an attribute storage area, wherein attribute weights for the intersection meta-data is calculated using the equation:

$$W(M_1 \cap M_2) = W(M_1) \cdot W(M_2),$$

wherein attribute weights for the union meta-data is calculated using the equation:

$$W(M_1 \cup M_2) = W(M_1) + W(M_2) - W(M_1) \cdot W(M_2), \text{ and}$$

wherein $M_1$ and $M_2$ are two subsets of meta-data, $W(M_1)$ is an attribute weight associated with subset $M_1$, $W(M_2)$ is an attribute weight associated with subset $M_2$, $W(M_1 \cap M_2)$ is a calculated attribute weight associated with the intersection meta-data of subset $M_1$ and subset $M_2$, and $W(M_1 \cup M_2)$ is a calculated attribute weight associated with the intersection meta-data of subset $M_1$ and subset $M_2$.

11. The apparatus of claim 10, wherein the attribute weights are changed based on external events by computing future attribute weights from past attribute weights by composing past attribute weights with external event weights as shown in the equation:

$$\begin{bmatrix} w_1 \\ w_2 \\ \ldots \\ w_j \end{bmatrix} = [e_1, e_2, \ldots, e_n] \cdot \begin{bmatrix} w_1 \\ w_2 \\ \ldots \\ w_i \end{bmatrix},$$

where $w_j$ are future attribute weights, $w_i$ are past attribute weights, and $e_n$ are external event weights.

12. The apparatus of claim 10, wherein the processor further comprises program code to:
receive video tips from one or more sources, the video tips being short video clips captured by citizens;
generate tip meta-data based on the video tips;
determine tip attribute weights for the tip meta-data; and
store the video tips in the video storage areas.

13. The apparatus of claim 10, wherein the processor further comprises program code to:
provide additional meta-data generated by a human operator; and
store the additional human generated meta-data, indexed to the video data by date and time stamp, in the meta-data storage module.

14. The apparatus of claim 10, wherein the processor further comprises program code to:
retrieve historical meta-data from the meta-data storage module;
evaluate a set of rules based on the historical meta-data and the generated meta-data; and
perform one or more actions based on the evaluation of the set of rules.

15. The apparatus of claim 10, further comprising:
a hierarchical video storage module adapted to archive the video data based at least on meta-data and attribute weights associated with the video data.

16. The apparatus of claim 10, further comprising:
a fiber optic line to an off-site location for archiving the video data off-site.

17. A method of searching and retrieving video data from a video surveillance system, the method comprising:
entering a search criteria;
searching meta-data associated with the video data, the meta-data generated by one or more video detection components and indexed to the video data;
retrieving meta-data matching the search criteria from a meta-data module;
retrieving video data indexed by the meta-data from a video storage module; and
retrieving attribute weights associated with the meta-data, the attribute weights representing reliability of the meta-data,
wherein attribute weights for intersection meta-data of two sub-sets of meta-data is calculated using the equation:
$W(M_1 \cap M_2) = W(M_1) \cdot W(M_2)$,
wherein attribute weights for union meta-data of two subsets of meta-data is calculated using the equation
$W(M_1 \cup M_2) = W(M_1) + W(M_2) - W(M_1) \cdot W(M_2)$,
wherein $M_1$ and $M_2$ are two subsets of meta-data, $W(M_1)$ is an attribute weight associated with subset $M_1$, $W(M_2)$ is an attribute weight associated with subset $M_2$, $W(M_1 \cap M_2)$ is a calculated attribute weight associated with the intersection meta-data of subset $M_1$ and subset $M_2$, and $W(M_1 \cup M_2)$ is a calculated attribute weight associated with the intersection meta-data of subset $M_1$ and subset $M_2$.

18. The method of claim 17, wherein the attribute weights includes data about the source of the meta-data.

19. The method of claim 17, further comprising:
storing audit information about who and when retrieved the video data.

20. An apparatus for storing video data, associated meta-data, and associated attribute weights from a video surveillance system, the apparatus comprising:
means for capturing video data from one or more surveillance cameras;
means for generating meta-data by performing video analysis on the video data from the surveillance cameras, the meta-data representing events detected in the video data;
means for determining attribute weights, representing information about the relevance of the meta-data;
means for generating intersections of two or more subsets of the meta-data to generate intersection meta-data;
means for determining attribute weights associated with the intersection meta-data by multiplying the attribute weights for each subset of meta-data;
means for generating unions of two or more subsets of the meta-data to generate union meta-data;
means for determining attribute weights associated with the union meta-data by adding the attribute weights for each subset of meta-data and subtracting a multiple of the attribute weights of each subset of meta-data;
means for changing the attribute weights based on external events by computing future attribute weights from past attribute weights by composing past attribute weights with external event weights;
means for storing the video data in a video storage area;
means for storing the meta-data, indexed by date and time stamp to the video data, in a meta-data storage area; and
means for storing the attribute weights in an attribute storage area,
wherein attribute weights for the intersection meta-data is calculated using the equation:

$W(M_1 \cap M_2) = W(M_1) \cdot W(M_2)$, wherein attribute weights for the union meta-data is calculated using the equation:

$W(M_1 \cup M_2) = W(M_1) + W(M_2) - W(M_1) \cdot W(M_2)$, and wherein $M_1$ and $M_2$ are two subsets of meta-data, $W(M_1)$ is an attribute weight associated with subset $M_1$, $W(M_2)$ is an attribute weight associated with subset $M_2$, $W(M_1 \cap M_2)$ is a calculated attribute weight associated with the intersection meta-data of subset $M_1$ and subset $M_2$, and $W(M_1 \cup M_2)$ is a calculated attribute weight associated with the intersection meta-data of subset $M_1$ and subset $M_2$.

21. The apparatus of claim 20, wherein the attribute weights are changed based on external events by computing future attribute weights from past attribute weights by com posing past attribute weights with external event weights as shown in the equation:

$$\begin{bmatrix} w_1 \\ w_2 \\ \dots \\ w_j \end{bmatrix} = [e_1, e_2, \dots, e_n] \cdot \begin{bmatrix} w_1 \\ w_2 \\ \dots \\ w_i \end{bmatrix},$$

where $w_j$ are future attribute weights, $w_i$ are past attribute weights, and $e_n$ are external event weights.

22. The apparatus of claim 20, further comprising:
means for receiving video tips from one or more anonymous sources, the video tips being short video clips captured by citizens;
means for generating tip meta-data based on the video tips, the tip meta-data representing events detected in the video tips; and
means for determining tip attribute weights for the tip meta-data, representing information about the relevance of the tip meta-data.

* * * * *

UNITED STATES PATENT AND TRADEMARK OFFICE
CERTIFICATE OF CORRECTION

| | |
|---|---|
| PATENT NO. | : 7,460,149 B1 |
| APPLICATION NO. | : 11/754335 |
| DATED | : December 2, 2008 |
| INVENTOR(S) | : John J. Donovan and Daniar Hussain |

It is certified that error appears in the above-identified patent and that said Letters Patent is hereby corrected as shown below:

On title page item [75]
The second named Inventor's first name is misspelled. The full name should be corrected to read:

HUSSAIN; DANIAR

Signed and Sealed this

Seventeenth Day of February, 2009

JOHN DOLL
*Acting Director of the United States Patent and Trademark Office*